US009836109B2

(12) United States Patent
Lee

(10) Patent No.: US 9,836,109 B2
(45) Date of Patent: Dec. 5, 2017

(54) IMAGE DISPLAY APPARATUS AND METHOD FOR CONTROLLING SAME

(71) Applicant: LG ELECTRONICS INC., Seoul (KR)

(72) Inventor: Soogi Lee, Seoul (KR)

(73) Assignee: LG ELECTRONICS INC., Seoul (KR)

(*) Notice: Subject to any disclaimer, the term of this patent is extended or adjusted under 35 U.S.C. 154(b) by 0 days.

(21) Appl. No.: 15/026,578

(22) PCT Filed: Apr. 7, 2014

(86) PCT No.: PCT/KR2014/002950
§ 371 (c)(1),
(2) Date: Mar. 31, 2016

(87) PCT Pub. No.: WO2015/050300
PCT Pub. Date: Apr. 9, 2015

(65) Prior Publication Data
US 2016/0239062 A1 Aug. 18, 2016

(30) Foreign Application Priority Data
Oct. 2, 2013 (KR) .................. 10-2013-0118211

(51) Int. Cl.
*G06F 1/26* (2006.01)
*G06F 1/30* (2006.01)
(Continued)

(52) U.S. Cl.
CPC ............. *G06F 1/263* (2013.01); *G06F 1/30* (2013.01); *G06F 1/3206* (2013.01);
(Continued)

(58) Field of Classification Search
CPC ..... G06F 1/30; G06F 1/3206; H04N 21/4436; H04N 21/4882; H04N 21/4383; H04N 5/50; H04N 5/63; G09G 2370/16
See application file for complete search history.

(56) References Cited

U.S. PATENT DOCUMENTS 5,177,375 A * 1/1993 Ogawa ............... G06F 1/24
327/143
5,386,247 A * 1/1995 Shafer ............... H04N 5/44513
348/563
(Continued)

FOREIGN PATENT DOCUMENTS

JP 2008-211652 A 9/2008
WO WO 2012/081289 A1 6/2012

OTHER PUBLICATIONS

International Search Report (with English translation) and Written Opinion dated Jul. 9, 2014 issued in Application No. PCT/KR2014/002950.

*Primary Examiner* — Brian Yenke
(74) *Attorney, Agent, or Firm* — KED & Associates, LLP

(57) ABSTRACT

The present disclosure relates to an image display apparatus including a battery and a method for controlling the same, and the image display apparatus, which receives an input signal for channel selection from an external input device, comprising: an antenna; a tuner for selecting a broadcast signal corresponding to a specific channel, among signals received through the antenna, on the basis of the input signal and converting the selected broadcast signal into an image signal; a display unit for outputting an image associated with the specific channel by using the converted image signal; a power supply unit which includes a battery, charges the battery while electric energy from the outside is received and supplies power to the display unit using the electric energy received from the outside; a power failure detection unit for
(Continued)

detecting whether power failure corresponding to a cut off of the electric energy supplied from the outside occurs; and a control unit for supplying power to the display unit using the battery when the power failure detection unit detects power failure and controlling brightness of at least one area of the display unit on the basis of residual capacity of the battery.

19 Claims, 13 Drawing Sheets

(51) Int. Cl.
  *G06F 1/32* (2006.01)
  *G09G 3/34* (2006.01)
  *G09G 5/00* (2006.01)
  *H04N 21/443* (2011.01)
  *H04N 5/63* (2006.01)
  *G09G 5/10* (2006.01)
  *G09G 5/373* (2006.01)
  *H04N 5/50* (2006.01)
  *H04N 5/57* (2006.01)
  *H04N 21/438* (2011.01)
  *H04N 21/488* (2011.01)
  *H04N 21/431* (2011.01)

(52) U.S. Cl.
  CPC ......... *G06F 1/3212* (2013.01); *G09G 3/342* (2013.01); *G09G 5/003* (2013.01); *G09G 5/10* (2013.01); *G09G 5/373* (2013.01); *H04N 5/50* (2013.01); *H04N 5/57* (2013.01); *H04N 5/63* (2013.01); *H04N 21/4318* (2013.01); *H04N 21/4383* (2013.01); *H04N 21/4436* (2013.01); *H04N 21/4882* (2013.01); *G06F 1/3265* (2013.01); *G09G 2320/0606* (2013.01); *G09G 2320/0626* (2013.01); *G09G 2330/02* (2013.01); *G09G 2340/0407* (2013.01); *G09G 2340/0414* (2013.01); *G09G 2340/0421* (2013.01); *G09G 2340/0428* (2013.01); *G09G 2370/16* (2013.01); *Y02B 60/1242* (2013.01); *Y02B 60/1292* (2013.01)

(56) References Cited

U.S. PATENT DOCUMENTS

| | | | | |
|---|---|---|---|---|
| 5,629,643 A * | 5/1997 | Moughanni | ............ | H03K 3/012 327/199 |
| 5,801,698 A * | 9/1998 | Lection | ............... | G06F 3/04812 715/236 |
| 5,867,224 A * | 2/1999 | Suh | ............... | H04N 5/44513 348/553 |
| 6,603,469 B1 * | 8/2003 | Gettemy | ............... | G06F 1/3203 345/102 |
| 6,618,042 B1 * | 9/2003 | Powell | ............... | G06F 1/263 345/204 |
| 6,618,045 B1 * | 9/2003 | Lin | ............... | G09G 5/10 345/207 |
| 6,812,649 B2 * | 11/2004 | Kim | ............... | H05B 41/3922 315/149 |
| 6,812,920 B1 * | 11/2004 | Otsuka | ............... | G06F 1/3215 315/106 |
| 6,947,035 B1 * | 9/2005 | Shiraga | ............... | G06F 1/1616 345/211 |
| 7,088,355 B1 * | 8/2006 | Ochi | ............... | G09G 3/3611 345/211 |
| 7,114,169 B1 * | 9/2006 | Kahn | ............... | G08B 27/008 725/32 |
| 7,126,647 B2 * | 10/2006 | Cha | ............... | H02M 1/15 307/126 |
| 7,139,017 B2 * | 11/2006 | Ali | ............... | H04N 17/00 345/211 |
| 7,154,408 B2 * | 12/2006 | Ku | ............... | H04B 1/202 340/539.1 |
| 7,283,803 B2 * | 10/2007 | Karaoguz | ............... | H04L 12/5695 370/352 |
| 7,554,536 B2 * | 6/2009 | Huh | ............... | G06F 1/3203 345/211 |
| 7,703,046 B2 * | 4/2010 | Fallon | ............... | G06F 1/28 715/736 |
| 7,768,579 B2 * | 8/2010 | Huang | ............... | H04N 5/63 348/705 |
| 7,913,274 B2 * | 3/2011 | Kendall | ............... | G08B 25/085 714/14 |
| 8,411,076 B2 * | 4/2013 | Berkay | ............... | H02M 3/145 345/211 |
| 8,482,580 B2 * | 7/2013 | Takeuchi | ............... | H04N 5/23245 345/619 |
| 8,482,677 B2 * | 7/2013 | Deshpande | ............... | H04N 5/63 320/111 |
| 8,583,951 B2 * | 11/2013 | Kuno | ............... | G11B 19/02 713/300 |
| 8,659,707 B2 * | 2/2014 | Toyoda | ............... | H04N 5/63 348/554 |
| 8,687,127 B2 * | 4/2014 | Kinoshita | ............... | H04N 5/44591 348/730 |
| 8,965,540 B2 * | 2/2015 | Yamashita | ............... | H02J 13/001 345/24 |
| 8,970,705 B2 * | 3/2015 | Baronas | ............... | G01D 1/00 348/160 |
| 9,075,381 B2 * | 7/2015 | Hiraguchi | ............... | G03G 15/5004 |
| 9,178,384 B2 * | 11/2015 | Wu | ............... | H02J 9/005 |
| 2004/0130556 A1 * | 7/2004 | Nokiyama | ............... | G01R 31/3682 345/617 |
| 2005/0046390 A1 * | 3/2005 | Kimura | ............... | G01R 31/362 320/132 |
| 2006/0119742 A1 * | 6/2006 | Park | ............... | G06F 1/3203 348/730 |
| 2006/0158571 A1 * | 7/2006 | Tsunoda | ............... | H04N 5/4403 348/734 |
| 2006/0176240 A1 * | 8/2006 | Nozaki | ............... | G06F 13/387 345/1.2 |
| 2009/0201271 A1 | 8/2009 | Michiyasu et al. | | |
| 2010/0007515 A1 * | 1/2010 | Ito | ............... | G06Q 10/06 340/6.1 |
| 2010/0010857 A1 * | 1/2010 | Fadell | ............... | G06F 1/3203 705/7.38 |
| 2010/0053440 A1 * | 3/2010 | Mortensen | ............... | H04N 5/44513 348/569 |
| 2010/0079595 A1 * | 4/2010 | Plut | ............... | G06F 1/3218 348/180 |
| 2010/0082414 A1 * | 4/2010 | Shimaya | ............... | G06F 1/3218 705/14.4 |
| 2010/0141848 A1 * | 6/2010 | Bastable | ............... | H04N 5/63 348/730 |
| 2010/0180139 A1 * | 7/2010 | Denney | ............... | G06F 1/30 713/330 |
| 2011/0030007 A1 * | 2/2011 | Cho | ............... | H04N 7/17318 725/40 |
| 2012/0262093 A1 * | 10/2012 | Recker | ............... | H05B 33/0854 315/308 |
| 2012/0320281 A1 * | 12/2012 | Kinoshita | ............... | H04N 21/4436 348/730 |
| 2012/0324260 A1 * | 12/2012 | Kezuka | ............... | H04N 5/57 713/320 |
| 2013/0021534 A1 * | 1/2013 | Hill | ............... | G08B 21/24 348/734 |
| 2013/0083241 A1 | 4/2013 | Sakurai | | |
| 2013/0342131 A1 * | 12/2013 | Recker | ............... | H05B 33/0842 315/292 |

\* cited by examiner

FIG. 6
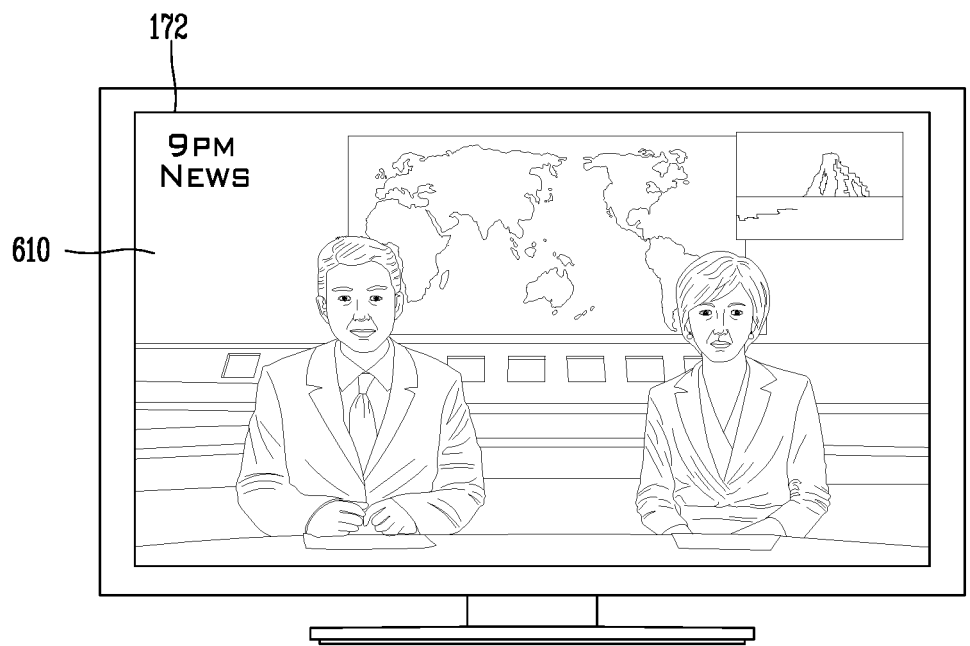
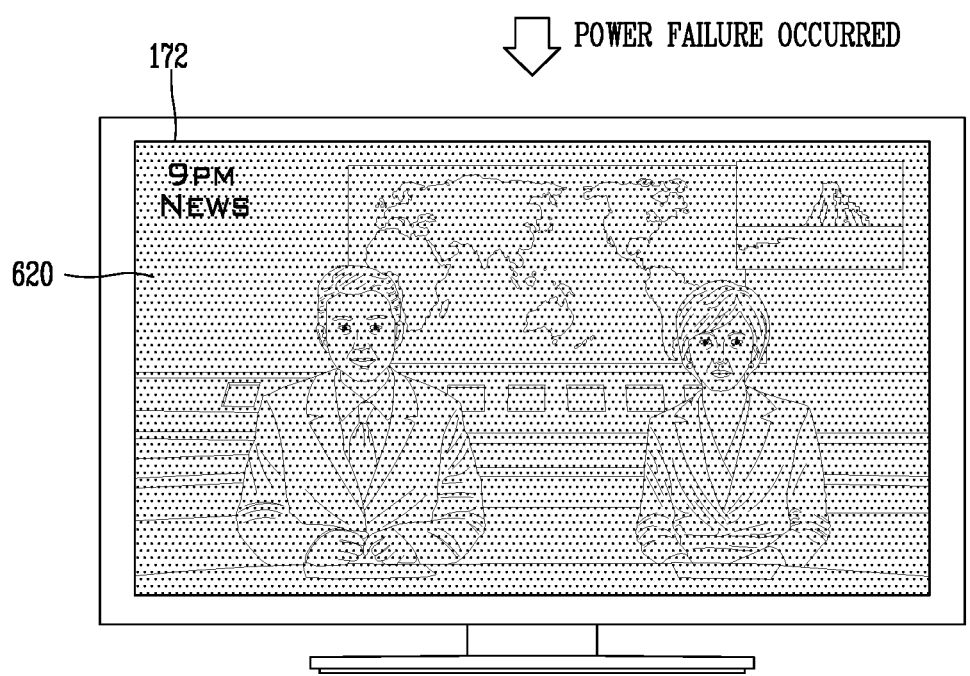

FIG. 7
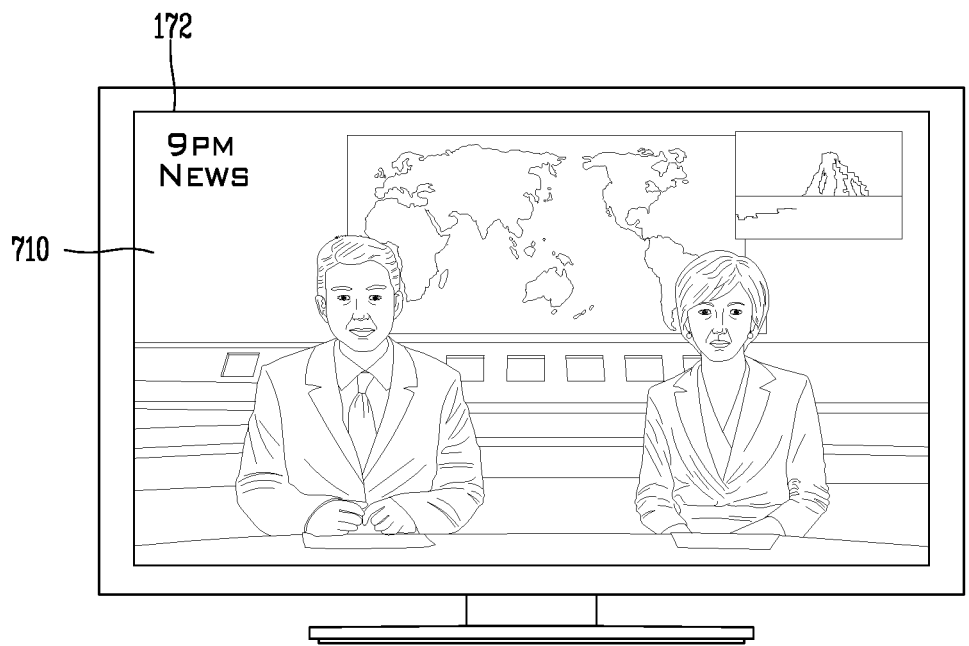
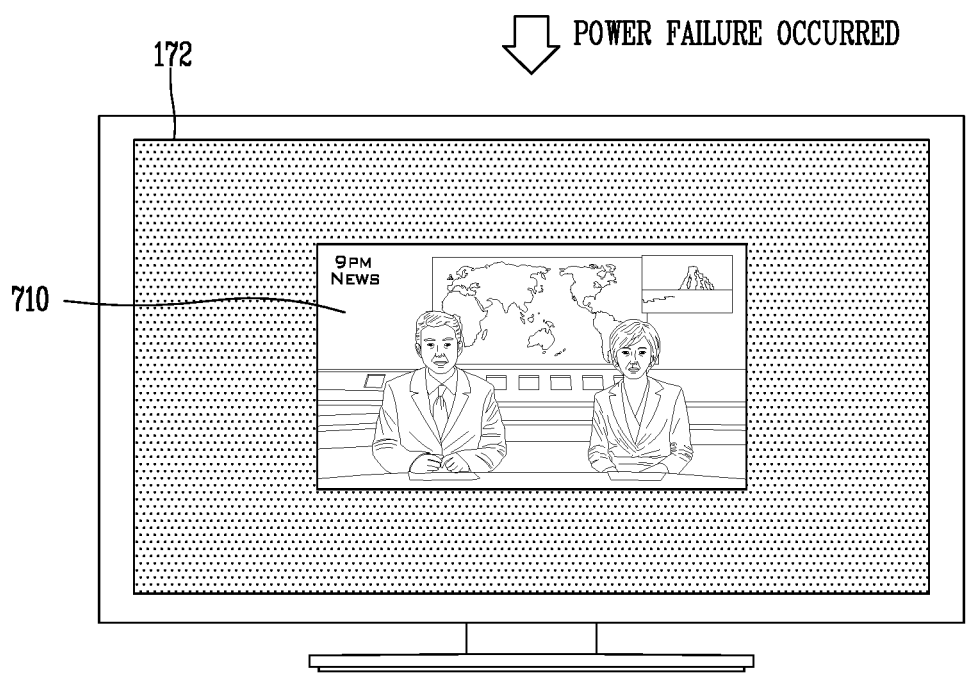

FIG. 15
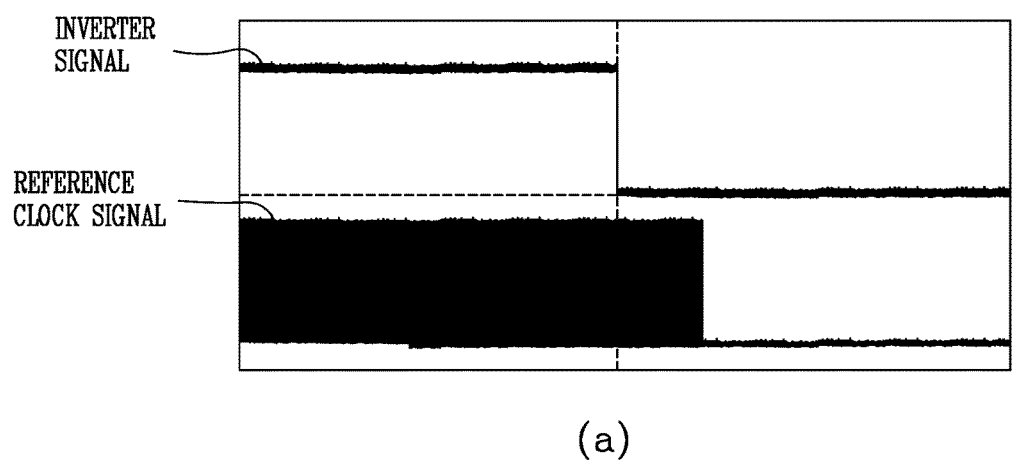
(a)
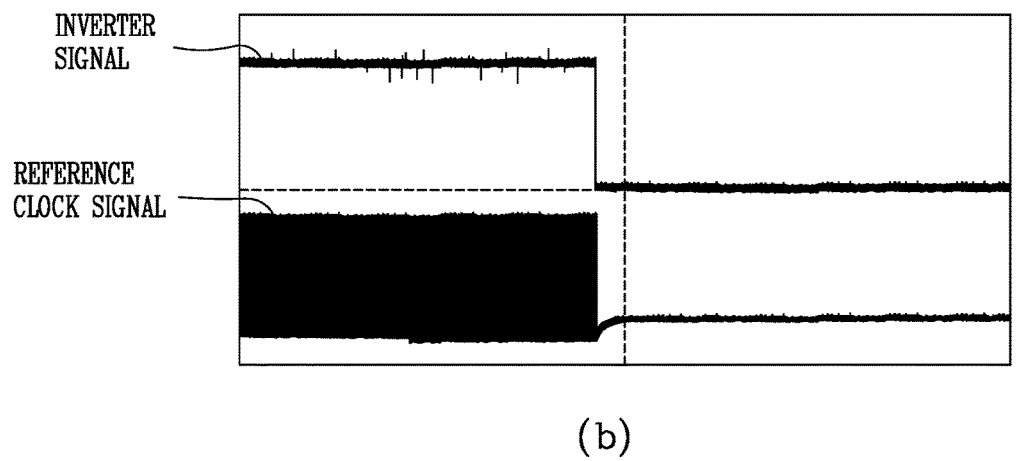
(b)

IMAGE DISPLAY APPARATUS AND METHOD FOR CONTROLLING SAME

CROSS-REFERENCE TO RELATED PATENT APPLICATIONS

This application is a U.S. National Stage Application under 35 U.S.C. §371 of PCT Application No. PCT/KR2014/002950, filed Apr. 7, 2014, which claims priority to Korean Patent Application No. 10-2013-0118211, filed Oct. 2, 2013, whose entire disclosures are hereby incorporated by reference.

TECHNICAL FIELD

The present disclosure relates to an image display apparatus, and more particularly, an image display apparatus having a battery, and a method for controlling the same.

BACKGROUND ART

An image display apparatus includes all of devices which receive and display broadcast, or record and reproduce videos, and devices which record and reproduce audio. The image display apparatus includes a television, a computer monitor, a projector, and the like.

As it becomes multifunctional, an image display apparatus can be provided with multi-functionalities, such as reproducing music or video files, capturing still images or moving images, playing games, receiving broadcast and the like, so as to be implemented as an integrated multimedia player. To support and increase the functions of the image display apparatus, software improvement as well as structural improvement of the image display apparatus may be considered.

Specifically, an image display apparatus which is supplied in an area where power failure is frequently caused due to unstable electric power supply is improved to have a battery (or a cell) generating electric energy. In addition, demands on development of an image display apparatus capable of efficiently using its battery during power failure are increasing.

DISCLOSURE OF INVENTION

Technical Problem

Therefore, an aspect of the detailed description is to provide an image display apparatus capable of efficiently using a battery during power failure, and a method for controlling the same.

Solution to Problem

To achieve these and other advantages and in accordance with the purpose of the present invention, as embodied and broadly described herein, there is provided an image display apparatus receiving an input signal for selecting a channel from an external input device, the apparatus including an antenna, a tuner capable of selecting a broadcast signal corresponding to a specific channel, among signals received through the antenna, based on the input signal, and switching the selected broadcast signal into an image signal, a display unit capable of outputting an image associated with the specific channel using the switched image signal, a power supply unit provided with a battery, capable of charging the battery while electric energy is received from the exterior, and supplying power to the display unit using the externally-received electric energy, a power failure sensing unit capable of sensing whether or not power failure that the externally-supplied electric energy is cut off occurs, and a controller capable of supplying power to the display unit using the battery when power failure is sensed by the power failure sensing unit, and adjusting brightness of at least one area of the display unit based on a residual capacity of the battery.

In one exemplary embodiment of the present invention, the controller may reset the at least one area of the display unit according to a user input that is input to the external input device to re-adjust brightness of the display unit.

In one exemplary embodiment of the present invention, the controller may adjust brightness of at least one area of an entire area of a backlight that emits light to the display unit.

In one exemplary embodiment of the present invention, the at least one area for which the brightness is adjusted of the entire area of the backlight may be differently set according to the residual capacity of the battery.

In one exemplary embodiment of the present invention, the controller may scale down an image output on the display unit at a predetermined ratio and output the scaled-down image on a partial area of the display unit, when power failure is sensed.

In one exemplary embodiment of the present invention, a lamp emitting light toward an area, on which the scaled-down image is not output on the display unit, among a plurality of backlight lamps emitting light toward the display unit, may be turned off.

In one exemplary embodiment of the present invention, the predetermined ratio may be differently set based on a user input.

In one exemplary embodiment of the present invention, the controller may selectively execute one of a general mode, and a power-saving mode of using power of the battery in a saving manner based on the residual capacity of the battery, when power failure is sensed.

In one exemplary embodiment of the present invention, the controller may output power failure information notifying the occurrence of the power failure on the at least one area of the display unit when power failure is sensed.

In one exemplary embodiment of the present invention, the power failure information may include at least one of a residual capacity of the battery, a time for which an image is outputtable on the display unit with the residual capacity of the battery, contact information regarding an organization associated with power failure, and an instruction for action upon an occurrence of power failure.

In one exemplary embodiment of the present invention, the image display apparatus may further include a signal input/output unit capable of transmitting a message notifying the occurrence of the power failure to a power failure management server when the power failure is sensed by the power failure sensing unit.

In one exemplary embodiment of the present invention, the controller may output an estimated time, within which the power failure is expected to be recovered, on at least one area of the display unit when the predicted time is received from the power failure management server.

In one exemplary embodiment of the present invention, the controller may calculate brightness of the at least one area of the display unit for outputting an image until the estimated time on the basis of the residual capacity of the battery, and adjust brightness to the calculated brightness.

In one exemplary embodiment of the present invention, the controller may search for an external device, which is located within a predetermined distance and thus capable of performing wireless communication, and transmit a control command to the searched external device to activate a display unit provided on the searched external device, when power failure is sensed.

In one exemplary embodiment of the present invention, the controller may switch a channel of an image output on the display unit into a predetermined channel on which information related to the power failure is viewable, when power failure is sensed.

In one exemplary embodiment of the present invention, the power failure sensing unit may sense that power failure has occurred, when an inverter signal and a reference clock signal (Gclk) generated in the power supply unit are simultaneously switched into a low level.

To achieve these and other advantages and in accordance with the purpose of the present invention, as embodied and broadly described herein, there is provided a method for controlling an image display apparatus receiving an input signal for selecting a channel from an external input device, the method including: selecting a broadcast signal corresponding to a specific channel among signals received through an antenna, on the basis of the input signal, and outputting an image associated with the specific channel on the display unit using the selected broadcast signal; charging a battery while externally-supplied electric energy is received, and supplying power to the display unit using the externally-supplied electric energy; supplying power to the display unit using the battery when power failure occurs during the output of the image; and adjusting brightness of at least one area of the display unit based on a residual capacity of the battery.

In one exemplary embodiment of the present invention, the adjusting brightness of at least one area of the display unit may be configured to adjust brightness of at least one area of an entire area of a backlight that emits light to the display unit.

In one exemplary embodiment of the present invention, the method may further include searching for an external device located within a predetermined distance and capable of performing wireless communication, when power failure occurs, and transmitting a control command to the searched external device to activate a display unit provided on the searched external device.

In one exemplary embodiment of the present invention, the method may further include outputting power failure information notifying the occurrence of the power failure on the at least one area of the display unit.

Advantageous Effects of Invention

In accordance with the detailed description, an image display apparatus according to the present invention can output screen information using power charged in a battery when power failure occurs. Here, brightness of at least one area of a display unit can be adjusted on the basis of a residual capacity of the battery, which may result in optimizing efficiency of a battery use.

BRIEF DESCRIPTION OF DRAWINGS

FIG. 6 is an exemplary view of the image display apparatus 100 for describing the control method of FIG. 5.

FIGS. 7 and 8 are conceptual views illustrating a method of outputting an image on a partial area of a display unit during power failure in an image display apparatus in accordance with one exemplary embodiment of the present invention.

FIG. 15 is a view illustrating a method of sensing power failure in an image display apparatus in accordance with one exemplary embodiment of the present invention.

MODE FOR INVENTION

Description will now be given in detail according to exemplary embodiments disclosed herein with reference to the accompanying drawings, to help understanding and practicing the technical scope of the present invention by those skilled in the art to which the present invention belongs. However, the present invention can be implemented into various forms, and may not be limited to the following exemplary embodiments. For the sake of brief description with reference to the drawings, the same or equivalent components may be provided with the same or similar reference numbers, and description thereof will not be repeated.

Throughout this specification, an image display apparatus may include all of devices which receive and display broadcast, or record and reproduce videos, and devices which record and reproduce audio.

Figure 1:
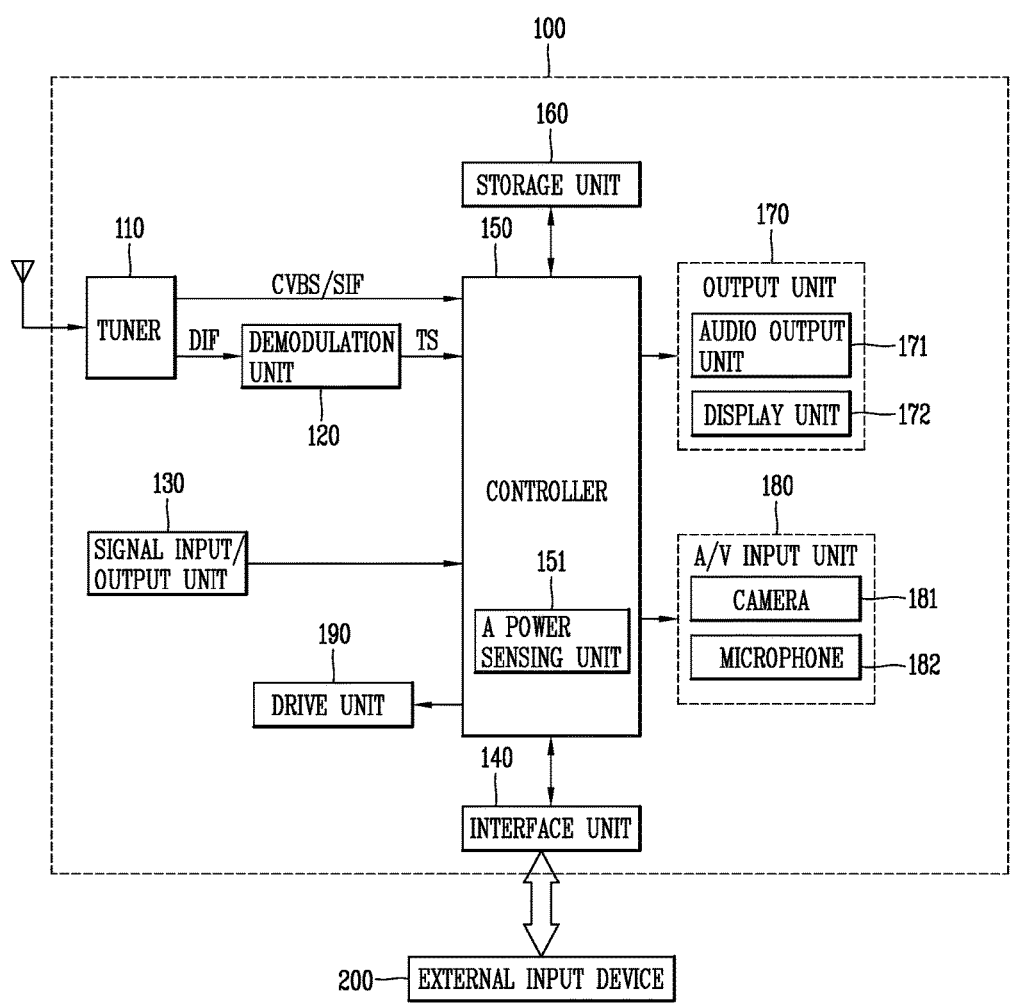
FIG. 1 is a block diagram illustrating an image display apparatus 100 and an external input device 200 in relation to the present invention.

FIG. 1 is a block diagram illustrating an image display apparatus 100 and an external input device 200 in accordance with the present invention. The image display apparatus 100 may include a tuner 110, a decoder 120, a signal input/output unit 130, an interface unit 140, a controller 150, a storage unit 160, an output unit 170, an audio/video (A/V) input unit 180, a driving unit 190 and a power sensing unit 151. The external input device 200 may be a separate device from the image display apparatus 100 or may be included as one component of the image display apparatus 100.

Referring to FIG. 1, the tuner 110 may select a radio frequency (RF) broadcast signal, which corresponds to a channel selected by a user, among RF broadcast signals received through an antenna, and convert the selected RF broadcast signal into a medium frequency signal or a baseband image (video)/audio signal. For example, when the RF broadcast signal is a digital broadcast signal, the tuner 110 may convert the RF broadcast signal into a digital IF signal (DIF). On the other hand, when the RF broadcast signal is an analog broadcast signal, the tuner 110 may convert the RF broadcast signal into an analog baseband video/audio signal (CVBS/SIF). The tuner 110 may thus be a hybrid tuner which is capable of processing the digital broadcast signal and the analog broadcast signal.

The digital IF signal (DIF) output from the tuner 110 may be input into the decoder 120, while the analog baseband video/audio signal (CVBS/SIF) output from the tuner 110 may be input into the controller 150. The tuner 110 may receive a single carrier RF broadcast signal according to an advanced television systems committee (ATSC) standard or a multi-carrier RF broadcast signal according to a digital video broadcasting (DVB) standard.

Although the drawing illustrates one tuner 110, the present disclosure may not be limited to this. The display apparatus 100 may include a plurality of tuners, for example, first and second tuners. In this case, the first tuner may receive a first RF broadcast signal corresponding to a broadcasting channel selected by a user, and the second tuner may receive a second RF broadcast signal corresponding to a pre-stored broadcasting channel in a sequential or periodical manner. Similar to the first tuner, the second tuber may convert an RF broadcast signal into a digital IF signal (DIF) or an analog baseband video or audio signal (CVBS/SIF).

The decoder 120 may receive the digital IF signal (DIF) converted by the tuner 110 and demodulate the received signal. For example, when the DIF output from the tuner 110 is a signal according to the ATSC standard, the decoder 120 may perform 8-vestigal side band (8-VSB) demodulation. Here, the decoder 120 may also perform channel decoding, such as trellis decoding, de-interleaving, reed Solomon decoding and the like. To this end, the decoder 120 may include a trellis decoder, de-interleaver, a reed Solomon decoder and the like.

For another example, when the digital IF signal (DIF) output from the tuner 110 is a signal according to the DVB standard, the decoder 120 may perform a coded orthogonal frequency division modulation (COFDMA) demodulation. Here, the decoder 120 may also perform convolution decoding, de-interleaving, reed Solomon decoding and the like. To this end, the decoder 120 may include a convolution decoder, a de-interleaver, a reed Solomon decoder and the like.

The signal input/output unit 130 may perform signal input and output operations by being connected in a wired/wireless manner to external devices, To this end, the signal input/output unit 130 may include an A/V input/output terminal (not illustrated) and a wireless communication unit (not illustrated).

The A/V input/output terminal may include an Ethernet terminal, a USB terminal, a composite video banking sync (CVBS) terminal, a component terminal, a S-video terminal (analog), a digital visual interface (DVI) terminal, a high definition multimedia interface (HDMI) terminal, a mobile high-definition link (MHL) terminal, an RGB terminal, a D-SUB terminal, an IEEE 1394 terminal, an SPDIF terminal, a liquid HD terminal, etc. A digital signal input through such terminals may be transmitted to the controller 150. An analog signal input through the CVBS terminal and the S-video terminal may be converted into a digital signal through an analogue/digital conversion unit (not shown), and then may be transmitted to the controller 150.

The wireless communication unit may execute wireless Internet access. Examples of such wireless Internet access may include Wireless LAN (WLAN) (Wi-Fi), Wireless Broadband (Wibro), Worldwide Interoperability for Microwave Access (Wimax), High Speed Downlink Packet Access (HSDPA) and the like. The wireless communication unit may execute short-range wireless communication with other electronic devices. The wireless communication unit, for example, may execute short-range wireless communication according to communication standards, such as Bluetooth, radio frequency identification (RFID), infrared data association (IrDA), ultra wideband (UWB), Zigbee and the like.

The signal input/output unit 130 may be connected to an external device, such as a digital versatile disk (DVD) player, a Bluray, a game machine, a camera, a camcorder, a laptop computer (notebook), a portable device and a smart phone. The signal input/output unit 130 may transfer a video, audio or data signal input from the exterior via the connected external device to the controller 150 of the image display device 100. Also, the signal input/output unit 130 may transfer a video, audio or data signal of various media files stored in an external storage device such as a memory device and a hard disk, to the controller 150. The video, audio or data signal processed by the controller 150 may be output to other external device.

In more detail, the signal input/output unit 130 may be connected to a set-top box, for example, a set-top box for an Internet protocol TV (IPTV), through at least one of the various terminals as mentioned above to perform a signal input and output operation. Also, the signal input/output unit 130 may deliver a video signal, an audio signal, and a data signal processed by the set-top box for an IPTV to the controller 150, such that bi-directional communication is available. The signal input/out unit 130 may deliver the signals processed by the controller 150 to the set-top box for an IPTV. Here, the IPTV may include an ADSL-TV, a VDSL-TV and an FTTH-TV, etc., differentiated according to a transmission network.

A digital signal output from the demodulation unit 120 and the signal input/output unit 130 may include a stream signal (TS). The stream signal (TS) may be a signal in which a video signal, an audio signal and a data signal are multiplexed. As one example, the stream signal (TS) may be an MPEG-2 transport stream (TS) signal obtained by multiplexing an MPEG-2 video signal and a Dolby AC-3 audio signal. In detail, an MPEG-2 TS signal may include a 4-byte header and a 184-byte payload.

The interface unit 140 may receive an input signal that is input by the user to control power, to select a channel, to configure a screen, etc., from the external input device 200 or transmit a signal processed by the controller 150 to the external input device 200. In this case, the interface unit 140 and the external input device 200 may be connected in a wired configuration or wirelessly.

As an example of the interface unit 140, a sensor may be provided. The sensor is configured to sense the input signal using a remote controller, for instance.

A network interface unit (not shown) provides an interface for connecting the image display device 100 to a wired or wireless network which includes an Internet network. The network interface unit may include an Ethernet terminal for connection to the wired network, and use communication standards, such as wireless LAN (WLAN) (Wi-Fi), wireless broadband (Wibro), world interoperability for microwave access (Wimax), high speed downlink packet access (HSDPA) and the like for connection to the wireless network.

The network interface unit (not shown) may access a predetermined web page through a network. That is, the network interface unit may transmit or receive data to or from a corresponding server, by accessing a predetermined web page. Also, the network interface unit may receive contents or data provided by a contents provider or a network operator. That is, the network interface unit may receive contents, such as a movie, an advertisement, a game, a VOD, a broadcast signal provided by the network operator, and related information via a network. The network interface unit may also receive update information related to firmware and update files provided by the network operator. Also, the network interface unit may transmit data to the contents provider or the network operator.

The network interface unit (not shown) may select a desired application among applications open to the public, via a network, and then may receive the selected application.

The controller 150 may control an entire operation of the image display device 100. More specifically, the controller 150 is formed to control generation and output of an image. For instance, the controller 150 may control the tuner 110 to tune an RF broadcast signal corresponding to a channel selected by a user or a pre-stored channel. Although not shown, the controller 150 may include a de-multiplexer, an image processor, a voice processor, a data processor, an On Screen Display (OSD) generator, etc. The controller 150 may include a CPU, a peripheral device, etc. by hardware.

The controller 150 may divide a stream signal (TS), e.g., an MPEG-2 TS, into an image signal, a voice signal and a data signal by a demultiplexing process.

The controller 150 may execute an image processing, e.g., a decoding process, with respect to a demultiplexed image signal. More specifically, the controller 150 may decode a coded image signal of an MPEG-2 standard by using an MPEG-2 decoder, and may decode a coded image signal of an H. 264 standard based on a digital multimedia broadcasting (DMB) method or a DVB-H, by using an H. 264 decoder. The controller 150 may execute an image processing with respect to an image signal, such that a brightness, a tint, a color, etc. of the image signal are controlled. The image signal processed by the controller 150 may be transmitted to the output unit (display unit) 170, or may be transmitted to an external output device (not shown) through an external output terminal.

The controller 150 may execute a voice processing with respect to a demultiplexed voice signal, e.g., a decoding process. More specifically, the controller 150 may decode a coded voice signal of an MPEG-2 standard by using an MPEG-2 decoder, and may decode a coded voice signal of an MPEG-4 bit sliced arithmetic coding (BSAC) standard based on a DMB method by using an MPEG-4 decoder. And the controller 150 may decode a coded voice signal of an MPEG-2 advanced audio codec (AAC) standard based on a DMB method or a DVB-H method by using an AAC decoder. The controller 150 may control a base, a treble, a sound, etc. A voice signal processed by the controller 150 may be transmitted to the audio output unit 171, e.g., a speaker, or may be transmitted to an external output device.

The controller 150 may execute a signal processing with respect to an analog baseband video or audio signal (CVBS/SIF). The analog baseband video or audio signal (CVBS/SIF) input to the controller 150 may be an analog baseband video or audio signal output from the tuner 110 or the signal input/output unit 130. The processed video signal is displayed on the display unit 172, and the processed audio signal is output through the audio output unit 171.

The controller 150 may execute a data processing with respect to a demultiplexed data signal, e.g., a decoding process. The data signal may include electronic program guide (EPG) information including broadcasting information such as a starting time and an ending time of a broadcasting program provided on each channel. The EPG information may include ATSC-Program and System Information Protocol (ATSC-PSIP) information based on an ATSC method, and may include DVB-Service Information (DVB-SI) based on a DVB method. The ATSC-PSIP information or the DVB-SI information may be included in a header (4 bytes) of an MPEG-2 TS.

The controller 150 may execute a control operation for an OSD processing. More specifically, the controller 150 may generate an OSD signal for displaying various types of information in the form of a graphic or a text, based on at least one of an image signal and a data signal, or based on an input signal received from the external input device 200. The OSD signal may include various data such as a user interface screen, a menu screen, a widget, and an icon of the image display device 100.

The storage unit 160 may store therein a program for signal processing and control of the controller 150, or may store therein a video signal, an audio signal and a data signal which have been processed. The storage unit 160 may include at least one storage medium of a flash memory-type storage medium, a hard disc-type storage medium, a multimedia card micro-type storage medium, a card-type memory (for example, SD or XD memory), a random access memory (RAM), a read-only memory (ROM), an electrically erasable programmable ROM (EEPROM), a programmable ROM (PROM), a magnetic memory, a magnetic disk, and an optical disk.

The output unit 170 may generate a visual output, an audible output and the like, and may include an audio output unit 171 and a display unit 172.

The audio output unit 171 outputs a voice signal processed by the controller 150, e.g., a stereo signal or a 5.1 channel signal. The audio output unit 171 may be implemented as various types of speakers.

The display unit 172 may convert a video signal, a data signal, an OSD signal, etc. processed by the controller 150 into an RGB signal, thereby generating a driving signal. With such a configuration, the display unit 172 outputs an image. The display unit 172 may be implemented as a plasma display panel (PDP), a liquid crystal display (LCD), a thin film transistor-liquid crystal display (TFT-LCD), an organic light emitting diode (OLED), a flexible display, a 3-dimensional (3D) display, an e-ink display, etc. The display unit 172 may serve as an input device by being implemented as a touch screen.

The A/V input unit 180 is configured to receive an audio or video signal, and may include a camera 181, a microphone 182, etc. The camera 181 processes image frames such as still images or moving images acquired by an image sensor in a video capturing mode or an image capturing mode. The processed image frames may be displayed on the display unit 172.

The image frames processed by the camera 181 may be stored in the memory 160 or transmitted via a radio communication unit. Two or more cameras 181 may be provided according to a user environment.

Meanwhile, the camera 181 can also capture a user. The camera 181 may be implemented as a single camera or a plurality of cameras. Information on images captured by the camera 181 is input to the controller 150.

For sensing of a user's gesture, a sensing unit, having at least one of a touch sensor, a sound sensor, a position sensor and an operation sensor, may be further provided at the image display device 100. A signal sensed by the sensing unit can be transferred to the controller 150 through the interface unit 140.

The controller 150 can sense a user's gesture based on images captured by the camera 181, or based on signals sensed by the sensing unit, or by combination of them.

The microphone 182 receives sounds (audible data) via a microphone in a phone call mode, a recording mode, a voice recognition mode, and the like, and processes such sounds into electric voice data. The microphone 182 may implement various types of noise canceling (or suppression) algorithms to cancel (or suppress) noise or interference generated when receiving and transmitting audio signals.

When the display unit 170 is implemented as a flexible display, the driving unit 190 applies a force so that at least part of the flexible display can be transformed. A method for applying a force will be explained with reference to FIGS. 5 and 7.

Still referring to FIG. 1, a power supply unit (not shown) supplies electric power to the image display device 100. Specifically, the power supply unit supplies electric power to the controller 150 that is realized in the form of a system-on chip (SOC), the display unit 172 for displaying an image, and the audio output unit 171 for outputting audio.

To do this, the power supply unit may include a converter (not shown) that converts DC power into AC power. For example, if the display unit 172 is realized as a liquid crystal panel including multiple backlight lamps, the power supply unit may further include an inverter (not shown) in which a PWM operation is possible for brightness variability and dimming drive.

In addition, the power supply unit (not shown) may include a battery (or a cell) which converts energy discharged by chemical or physical reaction into electric energy. The power supply unit may charge the battery while power is supplied from outside. Also, when power is not supplied from the outside, the power supply unit may supply power to the image display apparatus 100 using the energy stored in the battery. For example, when a plug of the image display apparatus 100 is separated from a consent or electricity or power supplied to home is temporarily cut off, the image display apparatus 100 may operate using power charged in the battery.

The battery may be installed in a body of the image display apparatus 100 or detachably coupled to an outside of the body.

Meanwhile, the image display apparatus according to one exemplary embodiment may further include a power failure sensing unit 151 that senses an occurrence or non-occurrence of power failure (or blackout). The power failure sensing unit 151 may sense whether or nor power supplied from outside has been cut off using a signal generated from the power supply unit. For example, the power failure sensing unit 151 may determine a power off by a user input, a separation between a plug and a consent, or an occurrence of power failure.

The external input device 200 is connected to the interface unit 140 by a cable or wirelessly, and transmits an input signal that is generated according to a user input, to the interface unit 140. The external input device 200 may include a remote controller, a mouse, a keyboard, and the like. The remote controller transmits an input signal to the interface unit 140 by using Bluetooth communication, RF communication, IR communication, ultra wideband (UWB) communication, ZigBee communication, or the like. The remote controller may be implemented as a spatial remote controller. The spatial remote controller may generate an input signal by detecting a movement of a main body.

The image display device 100 may be realized as a fixed type digital broadcast receiver for receiving at least one of an ATSC type (8-VSB type) digital broadcast, a digital broadcast, a DVB-T type (COFDM type) digital broadcast, and an ISDB-T type (BST-OFDM type) digital broadcast. Alternatively, the image display device 100 may be realized as a mobile type digital broadcast receiver for receiving at least one of a ground wave DMB type digital broadcast, a satellite DMB type digital broadcast, an ATSC-M/H type digital broadcast, a DVB-H type (COFEM type) digital broadcast, and a media forward link-only type digital broadcast. Alternatively, the image display apparatus 100 may be implemented as a digital broadcast receiver for cable communication, satellite communication or IPTV.

Figure 2:
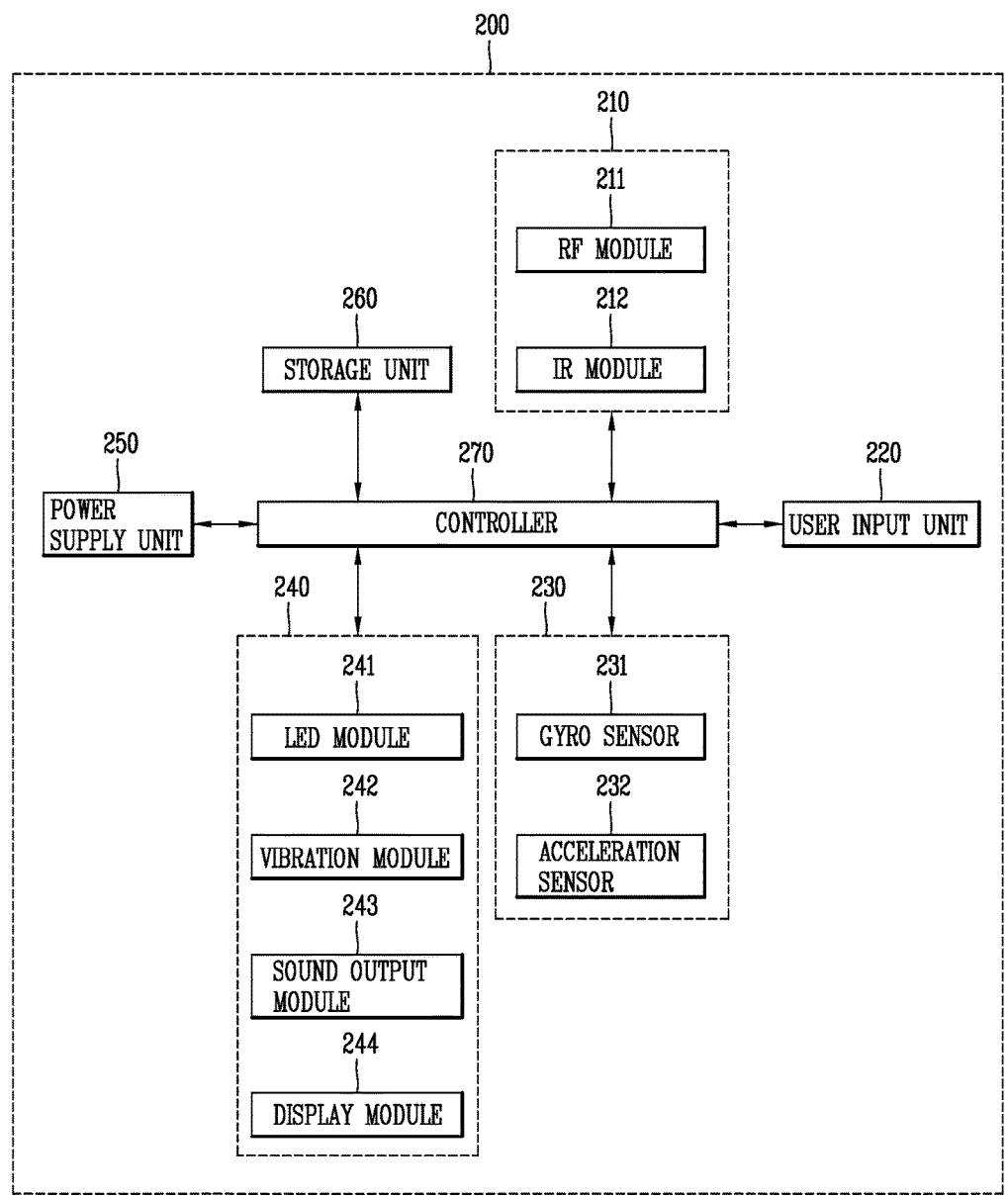
FIG. 2 is a block diagram illustrating the external input device 200 of FIG. 1 in detail.

FIG. 2 is a block diagram illustrating the external input device 200 of FIG. 1 in detail. The external input device 200 includes a wireless communication unit 210, a user input unit 220, a sensing unit 230, an output unit 240, a power supply unit 250, a storage unit 260 and a controller 270.

Referring to FIG. 2, the wireless communication unit 210 can transmit a signal to the image display device 100 or receive a signal from the image display device 100. To this end, the wireless communication unit 210 includes an RF module 211 and an IR module 212. The RF module 211 may transmit and receive signals according to an RF communication standard by being connected to the interface 140 of the image display device 100. The IR module 212 can transmit and receive signals according to an IR communication standard by being connected to the interface 140 of the image display device 100.

The user input unit 220 may include as an input element a keypad, a key button, a scroll key, a jog key and the like. The user may manipulate the user input unit 220 to input (enter) commands (instructions) related to the image display device 100. The command, for example, may be entered as a user pushes a hard key button of the user input unit 200.

The sensing unit 230 may include a gyro sensor 231 and an acceleration sensor 232. The gyro sensor 231 may sense a spatial movement of the external input device 200 based on X, Y and Z axes. The acceleration sensor 232 may sense a moving speed of the external input device 200 and the like.

The output unit 240 may output information in response to manipulation of the user input unit 230 and information corresponding to a signal sent by the image display device 100. Therefore, a user can recognize a manipulation state of the user input unit 230 or a control state of the image display device 100 through the output unit 230. For example, the output unit 240 may include an LED module 241 which is turned on and off, a vibration module 242 which generates vibration, an audio output module 243 which outputs sound, and a display module 244 which outputs images, in response to manipulation of the user input unit 230 or transmission and reception of signals through the wireless communication unit 210.

The power supply unit 250 can supply power to various electronic elements of the external input device 200. The power supply of the power supply unit 250 may be stopped when the external input device 200 does not move for a predetermined time, thereby reducing power consumption.

The power supply unit 250 may re-supply power when a predetermined key of the external input device 200 is manipulated.

The storage unit 260 can store various programs, which are involved with control and operations of the external input device 200, applications, frequency band information and the like. The controller 270 may execute an overall control operation of the external input device 200.

Figure 3:
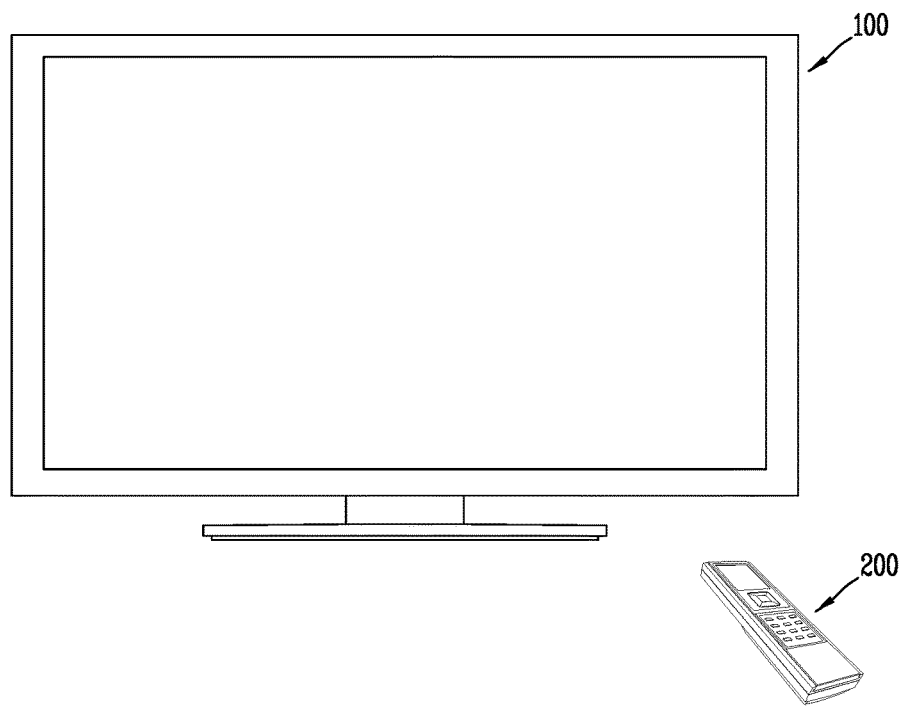
FIG. 3 is a conceptual view illustrating an interaction between the image output apparatus and an external input device in accordance with the present invention.

FIG. 3 is a conceptual view illustrating reciprocal operations of the image display device 100 and the external input device 200 according to an embodiment of the present invention. The image display device 100 is implemented as a TV receiver, and the external input device 200 is implemented as a remote controller.

Referring to FIG. 3, the external input device 200 can transmit and receive a signal to/from the image display device 100 according to an RF communication standard. A control menu may be displayed on a screen of the image display device 100 according to a control signal of the external input device 200. The external input device 200 may be provided with a plurality of buttons, and may generate an external input signal according to a user's operation to manipulate buttons.

Figure 4:
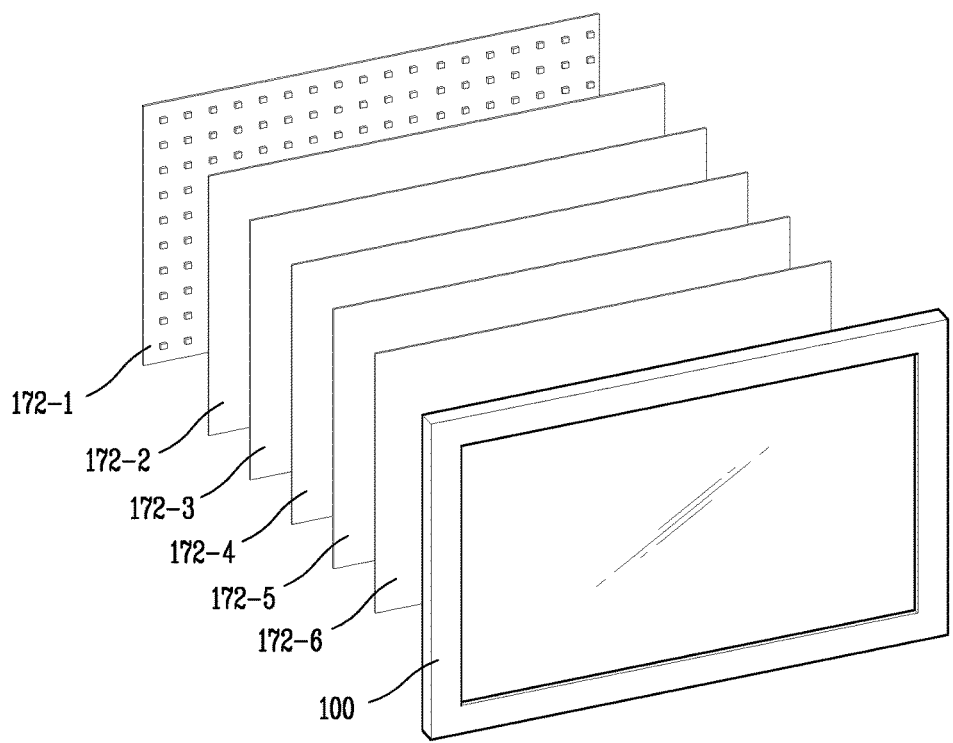
FIG. 4 is a conceptual view illustrating a configuration of a display unit 172 of the image display apparatus 100 illustrated in FIG. 1.

Hereinafter, description will be given of the display unit 172 of the image display apparatus 100 according to the exemplary embodiment of the present invention. FIG. 4 is a conceptual view illustrating a configuration of the display unit 172 of the image display apparatus 100 illustrated in FIG. 1.

The display unit 172 may include a backlight unit (BLU) and a display panel 172-6.

The backlight unit may be disposed on a rear surface of the display panel 172-6 to emit (output, radiate) light toward the display panel 172-6. The backlight unit may include a lamp 172-1, a reflection sheet 172-2, a light guide plate (LGP) 172-3, a diffusion sheet 172-4 and a prism sheet 172-5.

The lamp 172-1 may emit light to the display panel 172-6. The lamp 172-1 may be disposed on a rear surface of the light guide plate 172-3 or on a side surface of the light guide plate 172-3 to emit light between the reflection sheet 172-2 and the light guide plate 172-3. The lamp 172-1 may be provided with a plurality of light-emitting diodes (LEDs) emitting light, for example.

The lamp 172-1 may be provided in a grid pattern on an entire area of the rear surface of the display panel 172-6, or along an edge of the display panel 172-6. The number and formation positions of the lamp 172-1 provided in the backlight unit may vary according to embodiments.

The reflection sheet 172-2 may be disposed on a rear surface of the light guide plate 172-3 and reflect light leaked through a lower portion of the light guide plate 172-3 back to the light guide plate 172-3, thereby preventing a light leakage. A surface of the reflection sheet 172-2 facing the light guide plate 172-3 may form a mirror surface, like a mirror, so as to have high reflectivity.

The light guide plate 172-3 may guide the light emitted from the lamp 172-1 to be evenly distributed on an entire display area.

The diffusion sheet 172-4 may be disposed on an upper surface of the light guide plate 172-3 and diffuse light which transmits through the light guide plate 172-3. A preset pattern for efficiently diffusing light may be continuously formed on a surface of the diffusion sheet 172-4.

The light diffusion by the diffusion sheet 172-4 may allow for uniform distribution of the light but cause lowered brightness of the light. The prism sheet 172-5 may be provided with a prism pattern and thus refract and condense light coming out of the diffusion sheet 172-4 to increase the brightness of the light. A protection sheet may be disposed on the upper surface of the prism sheet 172-5. The protection sheet may protect the prism sheet 172-5 and diffuse light of which viewing angle is narrowed by the prism sheet 172-5.

The display panel 172-6 may have a display area on which an image can be substantially output, and an image may be formed on the display area. The display panel 172-6 may adjust an image by selectively transmitting light using a phenomenon that a direction of liquid crystal molecules changes in response to a voltage applied to the liquid crystal.

Meanwhile, explaining again the controller 150 of the image display apparatus 100 according to the one exemplary embodiment, when power failure is sensed by the power failure sensing unit 151, the controller 150 may adjust brightness of at least one area of the display unit 172 based on a residual capacity of (residual amount of power charged in) the battery. In this instance, the controller 150 may adjust brightness of the display unit 172 using the backlight unit, thereby increasing power efficiency of the battery.

Hereinafter, description will be given in detail of the image display apparatus 100 which adjusts brightness of at least one area of the display unit 172 upon an occurrence of power failure, with reference to the accompanying drawings.

Figure 5:
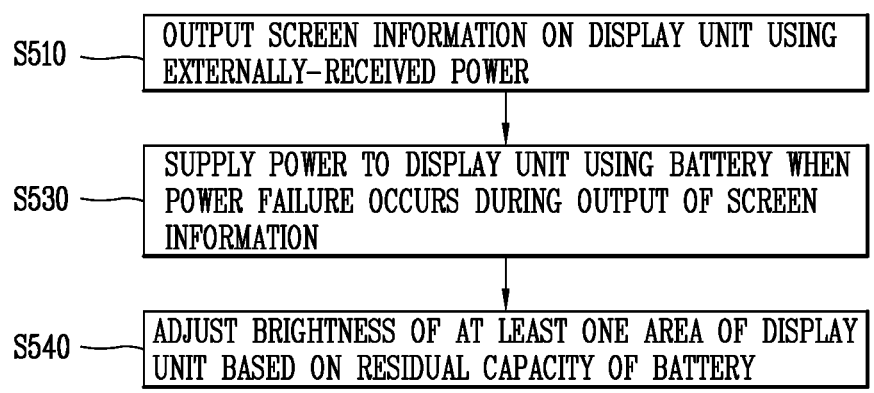
FIG. 5 is a flowchart illustrating a control method in accordance with one exemplary embodiment of the present invention.

FIG. 5 is a flowchart illustrating a control method in accordance with one exemplary embodiment of the present invention. FIG. 6 is an exemplary view of the image display apparatus 100 for describing the control method of FIG. 5. Hereinafter, a method of controlling the image display device upon occurrence of power failure will be described with reference to FIGS. 5 and 6.

First, screen information may be output on the display unit 172 using power supplied from outside (S510). The power supply unit (not shown) may convert AC power received from outside into DC power, and thus supply power to the image display apparatus 100 using the converted DC power.

In this instance, on the display unit 172 may be output screen information, such as an execution screen corresponding to one or more functions, an idle screen, a channel screen outputting a channel list and the like. In addition, an image corresponding to a broadcast of a specific channel may be output as screen information.

Next, when power failure occurs during the output of the screen information, power may be supplied to the display unit using the battery (S530).

The power failure sensing unit 151 (see FIG. 1) may determine whether or not power failure has occurred using a signal generated in the power supply unit (not shown). That is, the power failure sensing unit 151 may sense the occurrence or non-occurrence of the power failure. However, a method that the power failure sensing unit 151 senses power failure will be described later with reference to FIG. 15.

Meanwhile, when power failure is sensed by the power failure sensing unit 151, the controller 150 may switch power supply from external power into battery power. Accordingly, the screen information output on the display unit 172 may be output without being stopped even when power failure occurs.

Meanwhile, when the power failure is caused, every light may be highly likely to be turned off at a place in which the image display apparatus 100 is located. Specifically, in an area where power failure frequently occurs due to unstable power supply, light to brighten a dark place is needed when the power failure occurs. In this instance, since the image display apparatus can output screen information using the battery even during the power failure, the display unit can be used as a light or lamp. In this case, it may be required to efficiently use the battery of the image display apparatus until the power failure is solved.

Therefore, brightness of at least one area of the display unit may be adjusted on the basis of a residual capacity of the battery (S540). During power failure, the controller 150 may adjust brightness of at least one area of the display unit 172 to maximize efficiency of the battery. In this instance, the brightness of the display unit may refer to a degree of light and shade which is felt by a visual sensory area when light is projected, and may be measured as strength of light, namely, illumination.

Hereinafter, an exemplary embodiment of adjusting brightness of the display unit 172 will be described in detail. When power failure is sensed, brightness of at least one area of an entire area of the display unit 172 may be adjusted. That is, brightness of a partial area or an entire area of the display unit 172 may change based on a residual capacity of the battery. Hereinafter, an example of changing brightness of the entire area will preferentially be described.

When power failure is sensed by the power failure sensing unit 151, the controller 150 may measure a residual capacity (or residual amount of power) of the battery. The controller 150 may then adjust brightness of at least one area of the display unit 172 based on the measured residual capacity.

For example, referring to FIG. 6, an image (or video) of a news channel may be output as screen information 610 on the display unit 172. Afterwards, when power failure is sensed, the power supply unit (not shown) may supply power using the battery, and the controller 150 may adjust the display unit 172 to be darker than normal. Accordingly, brightness of screen information 620 during the power failure may be lowered than that when external power is normally supplied.

In the embodiment of adjusting screen brightness, the controller 150 may adjust the display unit 172 to become gradually darker in brightness from 100% corresponding to a fully charged state of the battery until 0% corresponding to a completely discharged state. For example, if it is assumed that brightness of the display unit 172 is 100 when the battery power is 100%, the controller 150 may adjust the brightness of the display unit 172 down to 75 when the battery power is 50%, and down to 50 when the battery power is 100%. That is, the controller 150 may adjust the brightness of the display unit 172 to be lower in proportion to the residual capacity of the battery.

In another exemplary embodiment, a total capacity of the battery may be divided into a plurality of sections, and brightness of the display unit may be preset to correspond to each section. For example, the brightness of the display unit 172 may be adjusted to 80 when the residual capacity belongs to a first section corresponding to 100% to 80% of residual power, and to 65 when the residual capacity belongs to a second section corresponding to 80% to 50% of residual power. A preset section and brightness of the display unit corresponding to the section may differently vary according to an embodiment.

In another exemplary embodiment, when power failure is sensed, the controller 150 may adjust brightness of the display unit 172 to a reference brightness optimizing efficiency of power. The controller 150 may automatically adjust the brightness of the display unit 172 to the reference brightness when the power failure is sensed, but thereafter the user can manually adjust the reference brightness using the external input device 200 (see FIG. 1).

Meanwhile, the controller 150 may keep activating the audio output unit 171 but deactivate the display unit 172 when a residual capacity of the battery reaches the least amount (reference amount) of power, which is required for outputting screen information. That is, the controller 150 may output only an audio (or voice) signal of a video (or image) signal or the audio signal of a broadcast corresponding to a specific channel, on the basis of the residual capacity of the battery. In this instance, the image display apparatus may output only an audio signal, like a radio, with stopping the output of screen information.

In this instance, the controller 150 may switch a currently-output channel into a news channel, such as an emergency disaster channel, for listening to the news. The audio output consumes less power than a video output, and thus the residual capacity of the battery can be efficiently used. In addition, since the audio signal of the news channel is output until power of the battery is completely consumed, the image display apparatus can provide necessary information upon an occurrence of a disaster.

Meanwhile, the controller 150 may measure the residual capacity of the battery during the operation of the image display apparatus, and output information related to the residual capacity. The controller 150 may control the display unit 172 to output a residual percentage and an image indicating the residual amount, in order to display the residual capacity. The controller 150 may control the display unit 172 to output a residual amount which varies according to a lapse of time.

The controller 150 may measure a discharging speed of the battery. The discharging speed may change depending on a type of a program (or application) executed on the image display apparatus, a number of programs, a user's control command, and the like.

In this instance, the controller 150 may adjust brightness of the display unit 172, taking into account of the discharging speed as well as the residual capacity of the battery. For example, when the discharging speed is fast, the brightness of the display unit 172 may be adjusted to be low, thereby increasing use efficiency of the battery.

The controller 150 may also compare the discharging speed with an allowable speed, and output an alarm when the discharging speed is faster than the allowable speed. When the discharging speed is excessively fast, the image display apparatus may output guide information to stop a currently-executed application. Meanwhile, the allowable speed may be designated by a user's setting. That is, the user can adjust a moment for outputting the alarm by adjusting the allowable speed.

This may result in alerting the user to the high discharging speed and also reducing power consumed to output screen information on an entire display area of the display unit 172, thereby effectively reducing the discharging speed.

Meanwhile, the controller 150 may adjust brightness of at least one area of the display unit 172 using the backlight unit (BLU; see FIG. 4) which emits light to the display unit 172. The controller 150 may adjust the brightness of the at least one area of the display unit 172 by adjusting brightness of at least one lamp included in the backlight unit or turning off the at least one lamp. For example, when a plurality of lamps are provided in a grid shape, the controller 150 may turn off lamps corresponding to an odd raw or lower brightness of the lamps, thereby reducing the use of the battery and adjusting the brightness of the display unit 172.

In this instance, the controller 150 may reduce battery power consumption by increasing a number of lamps which are turned off when less power is left in the battery. That is, at least one area, for which brightness is adjusted, among the entire area of the backlight unit may be differently set according to the residual capacity of the battery.

Meanwhile, when power failure is sensed, brightness of at least one area of the entire area of the display unit 172 may be adjusted. That is, brightness of a partial area or an entire area of the display unit 172 can change on the basis of the residual capacity of the battery.

Although not illustrated, when power is supplied by the battery, the controller 150 may output on one area of the display unit 172 at least one of a residual capacity (e.g., 60% charged) or an available time for using the image display apparatus with the residual capacity.

Meanwhile, the controller 150 may restore brightness of the display unit 172 to an original state and perform (re) charging of the battery when power failure is solved (that is, power is re-supplied from outside in a sensed state of power failure).

Figure 8:
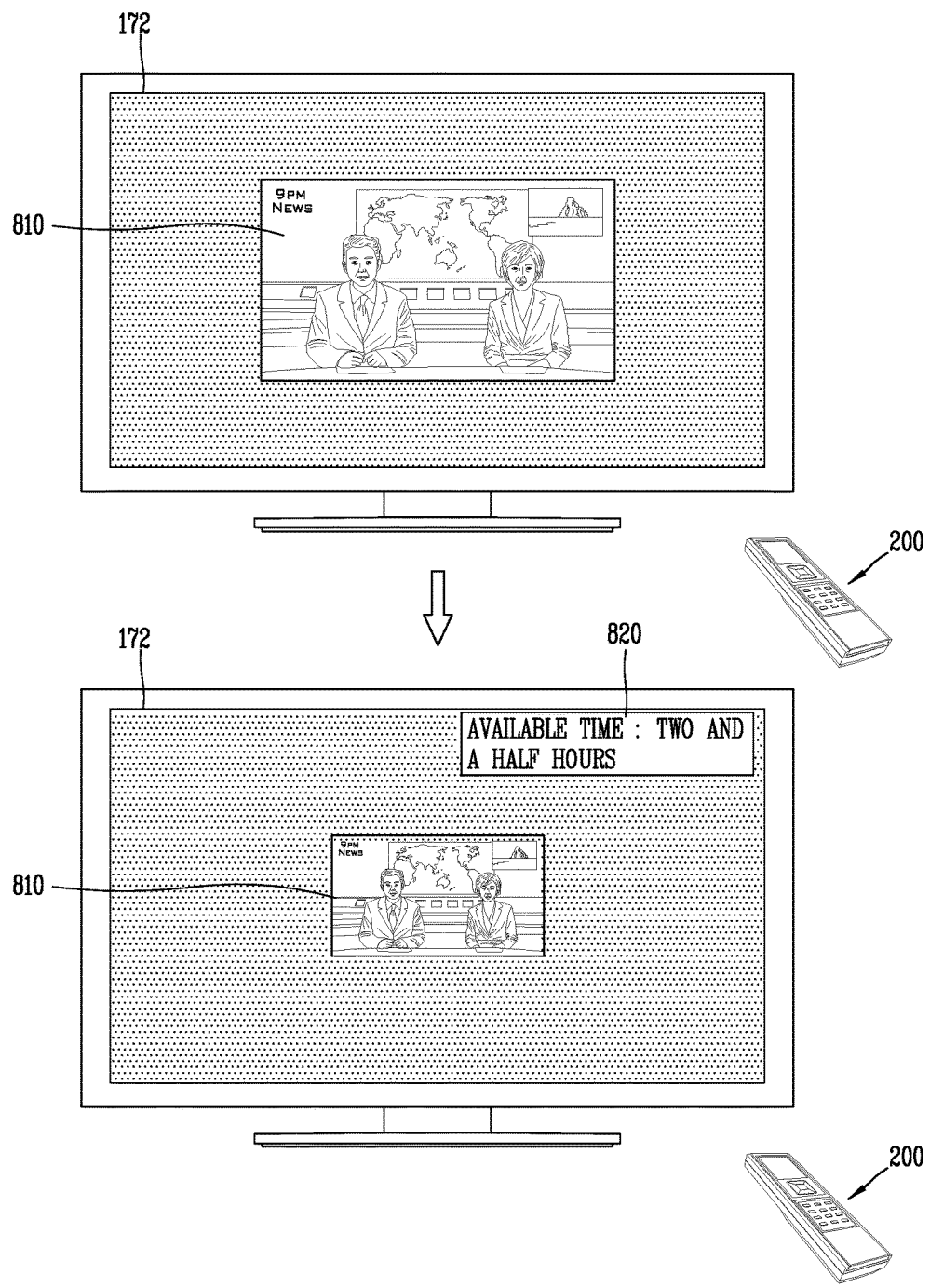

Hereinafter, description will be given of a method of adjusting brightness of at least one area, other than an entire area, of the display unit 172 on the basis of a residual capacity of the battery upon occurrence of power failure. FIGS. 7 and 8 are conceptual views illustrating a method of outputting an image on a partial area of a display unit during power failure in an image display apparatus in accordance with one exemplary embodiment of the present invention.

Referring to FIG. 7, the controller 150 may scale down screen information 710 which is output on the display unit 172 when power failure is sensed. The size of the screen information 710 may be configured to be smaller than that of a display area, which is defined as an area on which the display unit 172 can output an image. The other area of the display unit 172 except for the output area of the screen information 710 may be deactivated. As the screen information 710 is output, the deactivated area may increase, which may result in reducing battery consumption.

In this instance, the controller 150 may reduce the screen information output on the display unit 172 at a predetermined ratio, and output the reduced screen information on one area of the display unit 172. The predetermined ratio may be designated by a user's setting. That is, the user can adjust the size of the screen information output on the display unit 172 by changing the predetermined ratio.

The controller 150 may search for lamps which emit light to the other area, other than the output area of the reduced screen information, among the plurality of backlight lamps emitting light to the display unit 172, and turn off the searched lamps. That is, at least part of the display unit 172 may be deactivated by turning off the searched lamps.

Meanwhile, screen information output on the display unit 172 during power failure may be output in a manner of changing at least one of an output size and an output position, on the basis of a user input applied to the screen information. For example, as illustrated in FIG. 8, when a scale-down command with respect to screen information 810 is received through the external input device 200, the controller 150 may scale down the screen information 810 based on the scale-down command and deactivate an area where the screen information is not output.

The user input applied to the screen information may be a pinch-in touch input, a pinch-out touch input or a drag touch input applied to the screen information in case where the display unit 172 is a touch screen. For example, the screen information output on the display unit 172 may be scaled down when the user input is the pinch-in touch input, and scaled up when the user input is the pinch-out touch input. Also, the output position of the screen information may change when the user input is the drag touch input.

Meanwhile, the controller 150 may re-calculate the discharge speed of the battery as the output area of the screen information 810 changes. The controller 150 may then output, on at least one area of the display unit 172, time information 820 for outputting the screen information with the residual capacity of the battery on the basis of the calculated discharging speed.

The time information 820 may include the residual capacity of the battery, an available time of the battery, a size difference of the display area before and after change (e.g., 'the battery is available for 30 more minutes than before changing the size of the display area'), and the like.

The time information 820 may be output on one area along with the screen information 810, or as illustrated in FIG. 8, output on a different area from the screen information 810. When the time information 820 and the screen information 810 are output on the different areas, the controller 150 may activate a plurality of areas on the display unit 172 and deactivate the other areas.

In addition, the controller 150 may deactivate the entire area of the display unit 172 based on a user input, and control the audio output unit 171 to output only an audio signal, like a radio.

Meanwhile, when power failure occurs, the image display apparatus may notify the occurrence of the power failure to the user and provide an interface for the user to adjust the brightness of the display unit, as well as automatically adjusting brightness of the display unit. Hereinafter, the image display apparatus which provides an interface for adjusting brightness of the display unit will be described in detail.

Figure 9:
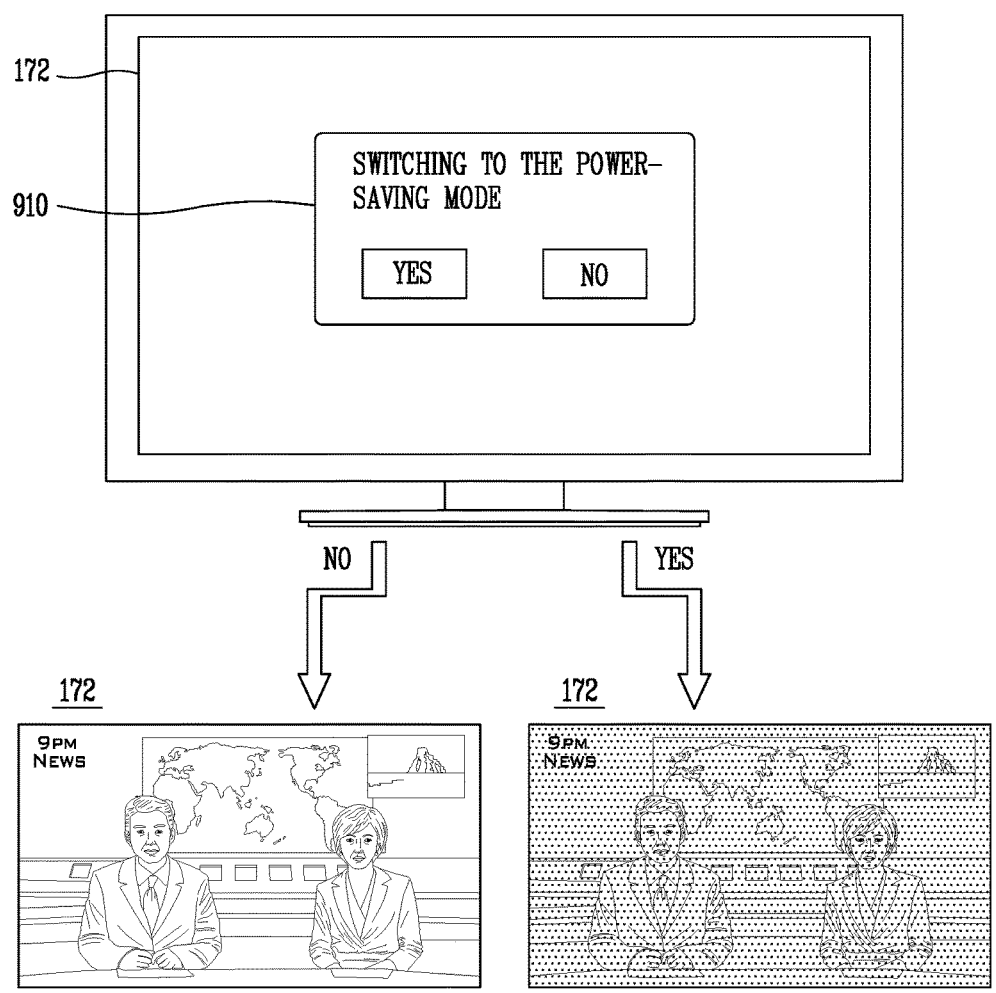
FIGS. 9 and 10 are conceptual views illustrating a method of selecting an output mode during power failure on an image display apparatus in accordance with one exemplary embodiment of the present invention.
Figure 10:
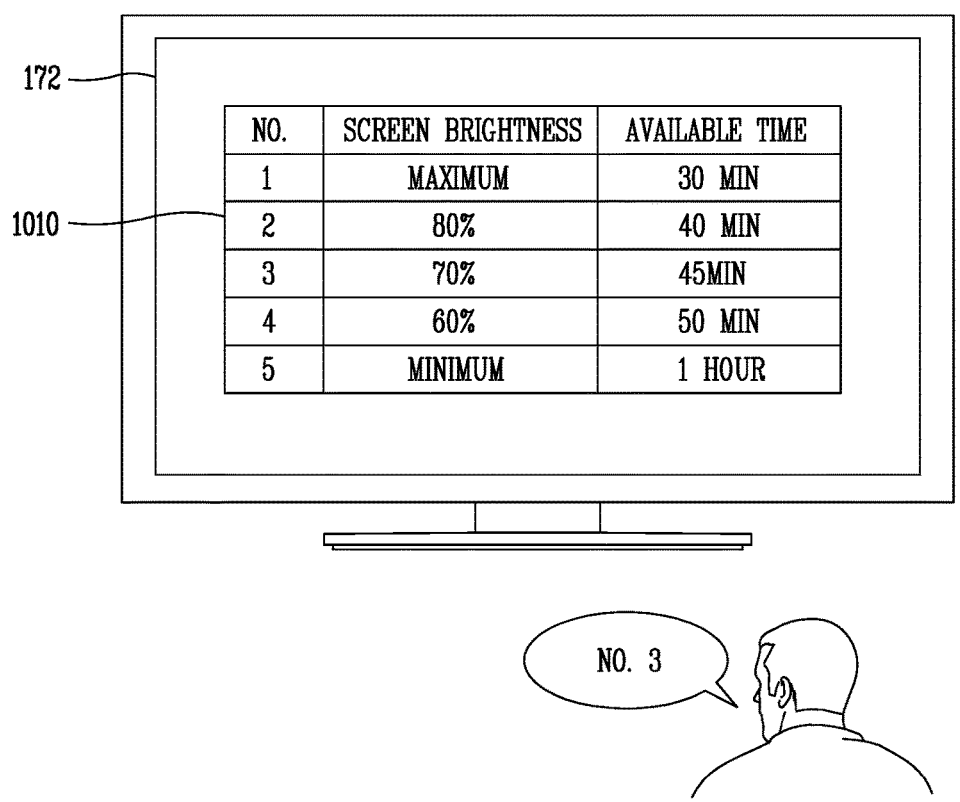

FIGS. 9 and 10 are conceptual views illustrating a method of selecting an output mode during power failure on an image display apparatus in accordance with one exemplary embodiment of the present invention.

Referring to FIG. 9, the controller 150 may output an interface 910 for adjusting brightness of the display unit 172 on the display unit 172 when power failure is sensed by the power failure sensing unit 151.

For example, when power failure is sensed, the controller 150 may output on the display unit 172 a popup window 910 for the user to select one of a general mode of maintaining brightness of the display unit 172 at normal times, and a power-saving mode of saving power of the battery based on a residual capacity of the battery. The controller 150 may selectively execute the one of the general mode and the power-saving mode based on a user input.

Execution modes which the user can select may differently vary according to embodiments. For example, the execution modes may include a radio mode of outputting only an audio signal like a radio, a lighting mode of outputting a white screen without outputting any information on the display unit, a maximum power-saving mode of minimizing consumption of the battery, a power failure guiding mode of outputting information related to power failure, and the like.

In another example, as illustrated in FIG. 10, the controller 150 may output a select menu 1010 including various screen brightness selectable by the user when power failure is sensed. The controller 150 may select one of the various screen brightness based on a user input, and adjust the brightness of the display unit 172.

In this instance, the controller 150 may calculate an available time of the battery, and output the calculated available time by including in the select menu 1010. The available time may refer to a time (e.g., '45 minutes') for which screen information is continuously outputtable when the screen information is output with specific screen brightness (e.g., 70%). In this instance, the user can select brightness of the display unit desiring to output by using information related to the available time, as well as the brightness of the display unit.

Meanwhile, the user can select screen brightness by a voice command (e.g., "the number 3"), in response to a touch applied to the touch screen, or using the external input device 200 (see FIG. 1).

Figure 11:
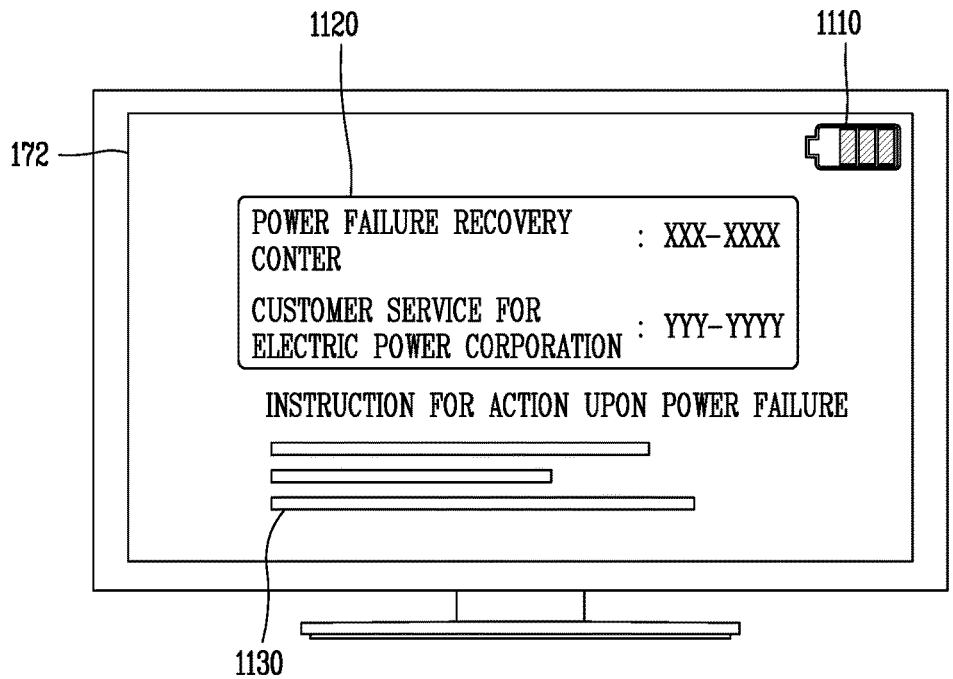
FIG. 11 is a conceptual view illustrating a method of guiding power failure information in an image display apparatus in accordance with one exemplary embodiment of the present invention.

FIG. 11 is a conceptual view illustrating a method of guiding power failure information in an image display apparatus in accordance with one exemplary embodiment of the present invention.

As illustrated in FIG. 11, the controller 150 may output power failure information for guiding (notifying) an occurrence of the power failure on at least one area of the display unit 172 when the power failure is sensed.

The power failure information may include at least one of a residual capacity 1110 of the battery, an available time capable of outputting screen information on the display unit using the residual power of the battery, contact information 1120 regarding an organization associated with power failure, and an instruction 1130 for action upon occurrence of power failure.

In addition, the power failure information may be updated in real time by information transmitted from a power failure management server. Hereinafter, description will be given in detail of a method of performing communication between the image display apparatus 100 and the power failure management server upon occurrence of power failure and outputting information related to the power failure.

Figure 12:
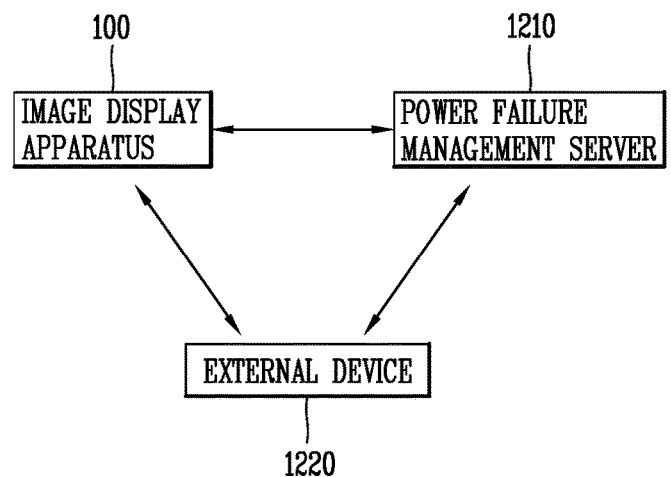
FIGS. 12 and 13 are conceptual views illustrating a method of performing communication with an external device during power failure in an image display apparatus in accordance with one exemplary embodiment of the present invention.
Figure 13:
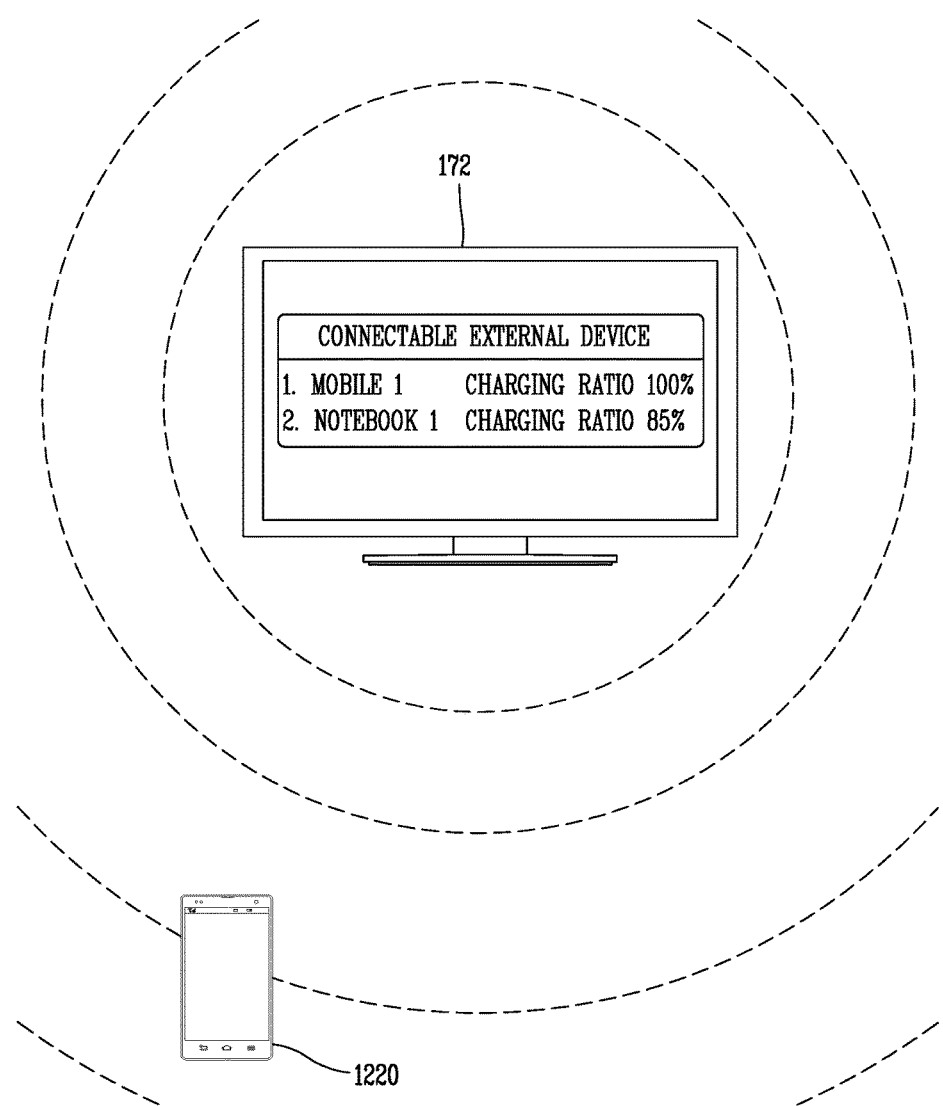

FIGS. 12 and 13 are conceptual views illustrating a method of performing communication with an external device during power failure in an image display apparatus in accordance with one exemplary embodiment of the present invention.

As illustrated in FIG. 12, a system according to one exemplary embodiment of the present invention may include at least one of the image display apparatus 100, a power failure management server 1210, and an external device 1220.

The image display apparatus 100 may transmit a message notifying an occurrence of power failure to the power failure management server 1210 in a wired or wireless manner using the signal input/output unit 130 (see FIG. 1) upon the occurrence of the power failure. The message may include an occurred position of the power failure, an occurred time of the power failure, and the like.

Meanwhile, the power failure management server 1210 may transmit guide information related to the power failure to the image display apparatus 100. The guide information may include a cause of the power failure, an estimated (or expected) recovery time for recovering the power failure, a coping method according to the occurrence of the power failure, and the like.

When the guide information is received from the power failure management server 1210, the image display apparatus 100 may output the received guide information on the display unit. For example, upon reception of the estimated recovery time within which the power failure is expected to be recovered, the estimated recovery time may be output on at least one area of the display unit.

Also, the image display apparatus 100 may calculate brightness of the display unit for outputting an image until the estimated time based on a residual capacity of the battery, and adjust the brightness of the display unit to the calculated brightness. For example, when two hours are required to solve the power failure, the brightness of the display unit may be adjusted to output screen information for two hours.

Meanwhile, when the image display apparatus 100 is unable to perform communication directly with the power failure management server 1210, the image display apparatus 100 may perform communication indirectly with the power failure management server 1210 through the external device 1220 which can perform communication with the power failure management server 1210. When power failure occurs, the image display apparatus 100 may search for an external device which is located within a predetermined distance and thus capable of performing wireless communication, and transmit a message for notifying the occurrence of the power failure to the power failure management server 1210. That is, the image display apparatus 100 may transmit a control command to the external device 1220 to transmit the message to the power failure management server 1210, and the external device 1220 may then transmit the message to the power failure management server 1210, in response to the control command.

To this end, as illustrated in FIG. 13, when power failure occurs, the controller 150 of the image display apparatus 100 may search for external devices located within a short distance, and output a list of the searched external devices on the display unit 172. In this instance, the list of external devices may include names, types, and charging ratios of the searched external devices.

And, the controller 150 may select at least one external device in response to a user input, and transmit a message for notifying the occurrence of the power failure to the power failure management server 1210 through the selected external device.

Meanwhile, when power failure occurs, it may be difficult to find an electronic device, such as a cellular phone, due to every indoor light off. To solve this, when power failure occurs, the controller 150 of the image display apparatus 100 may search for an external device located within a predetermined distance, and transmit a control command for activating an output unit provided in the searched external device. For example, an external device may activate a display unit or a light-emitting unit such as a flash, output an audio, or generate a vibration with a preset interval using a haptic module, in response to the received control command. Accordingly, the user can easily find the external device.

In addition, as illustrated in FIG. 13, the image display apparatus 100 may output the list of the searched external devices on the display unit 172, and transmit a control command to an external device selected based on a user input to activate its output unit. For example, when "Mobile 1" is selected, the controller 150 may transmit a control command for activating a flash of "Mobile 1." This may facilitate the user to find a specific external device among a plurality of external devices.

Figure 14:
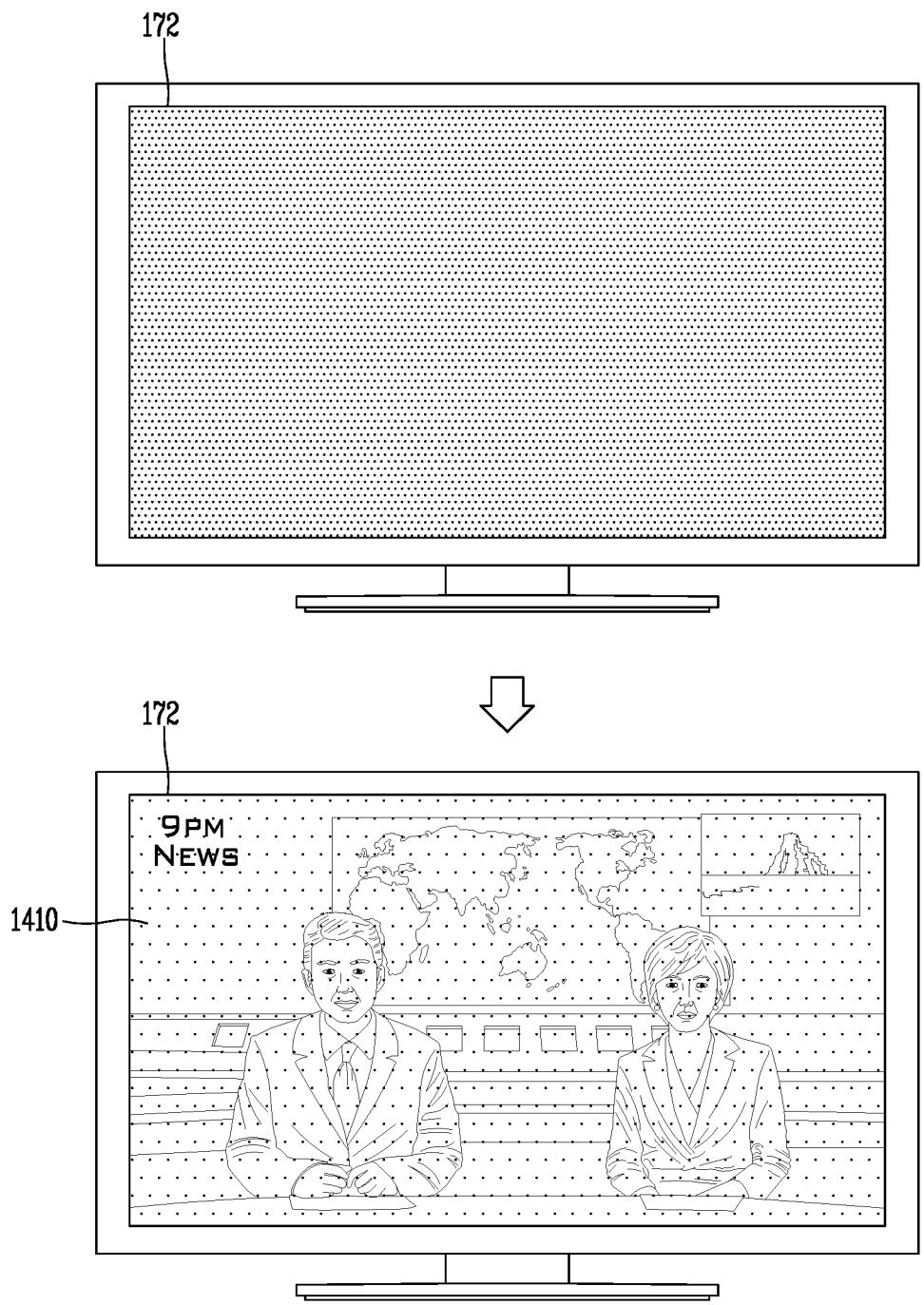
FIG. 14 is a conceptual view illustrating an operating method when power failure occurs in a power-off state of an image display apparatus in accordance with one exemplary embodiment of the present invention.

FIG. 14 is a conceptual view illustrating an operating method when power failure occurs in a power-off state of an image display apparatus in accordance with one exemplary embodiment of the present invention.

As illustrated in FIG. 14, the image display apparatus 100 may include the display unit 172 which is deactivated in a power-off state. In this instance, a plug connected with the power supply unit (not shown) may be inserted into a consent, and the power supply unit may charge the battery using externally-supplied power.

Meanwhile, when power failure is sensed by the power failure sensing unit 151 (see FIG. 1), the controller 150 may activate the deactivated display unit 172 to output screen information 1410. In this instance, the screen information 1410 may be the power failure information aforementioned with reference to FIG. 11, or a white screen without including any information.

When power failure suddenly occurs, every indoor light may be turned off. In this instance, the display unit 172 of the image display apparatus 100 may be activated by power charged in the battery, so as to serve as a light.

Here, the controller 150 may adjust brightness of at least one area of the display unit 172 according to a residual capacity of the battery, thereby efficiently managing the use of power.

FIG. 15 is a view illustrating a method of sensing power failure in an image display apparatus in accordance with one exemplary embodiment of the present invention.

The power failure sensing unit 151 (see FIG. 1) may sense whether or not power failure occurs based on a signal generated in the power supply unit. The power supply unit may output an inverter signal and a reference clock (Gclk) signal according to whether or not external power is supplied.

In this instance, when power is off by a user input, as illustrated in (a) of FIG. 15, the reference clock signal may be changed into a low level after a predetermined time since the inverter signal is changed into a low level.

On the other hand, when power is off due to power failure, as illustrated in (b) of FIG. 15, the inverter signal and the reference clock signal may simultaneously be changed into a low level. Therefore, the power failure sensing unit 151 may sense the occurrence or non-occurrence of the power failure using the inverter signal and the reference clock signal.

The power failure sensing unit 151 may also sense whether or not the plug connected with the power supply unit is inserted into the consent. When the plug is separated from the consent, the power failure sensing unit 151 may also process it as the non-occurrence of the power failure.

As described above, the image display apparatus according to the present invention can output screen information using power charged in the battery when power failure occurs. Here, brightness of at least one area of the display unit can be adjusted based on a residual capacity of the battery, which may result in optimizing efficiency of the battery use. And, a white screen without including any screen information can be output on the display unit using the power of the battery, and thus the image display apparatus can be used as a light upon the occurrence of the power failure.

Also, when power failure occurs, the occurrence of the power failure can be notified to the exterior using an external device or the like, which may result in fast obtaining an occurred position of the power failure, and fast copying with this. In addition, the automatic adjustment of the brightness of the display unit may allow a user to use the image display apparatus with the residual capacity until an estimated recovery time.

Also, when power failure occurs, an output unit of an external device located within a short distance can be activated, which may facilitate the user to find an external device necessary for the situation of the power failure. By outputting a list of external devices located at a short distance, the user can select an external device desiring to activate, thereby enhancing user convenience.

On the other hand, according to one embodiment disclosed in the present specification, the method described above may be realized by being stored as processor-readable codes in a program-stored medium. A ROM, a RAM, a CD-ROM, a magnetic tape, a floppy disk, an optical data storage device and the like are examples of the processor-readable medium, and the processor-readable medium may be realized in the form of a carrier wave (for example, a transmission over the Internet).

The configuration and method of the foregoing embodiments and advantages are not to be considered as limiting the present invention, but a part or all of each embodiment can selectively be combined to implement different variations. For example, the foregoing method is not limited only to a case of receiving a broadcast content in real time, but is applied even to a case where the broadcast content is stored in the storage unit 160.

INDUSTRIAL AVAILABILITY

The embodiments of the present invention propose an image display apparatus capable of efficiently managing a battery upon an occurrence of power failure, and can be applied to various related industrial fields.

The invention claimed is:

1. An image display apparatus receiving an input signal for selecting a channel from an external input device, the apparatus comprising:
   a tuner capable of selecting a broadcast signal corresponding to a specific channel based on the input signal, and switching the selected broadcast signal into an image signal;
   a display capable of outputting an image associated with the specific channel using the switched image signal;
   a power supply provided with a battery and capable of charging the battery while electric energy is received from an exterior and supplying power to the display using the externally-received electric energy;
   a power failure sensor capable of detecting a power failure during which the externally-received electric energy is cut off; and
   a controller capable of supplying power to the display using the battery when power failure is detected by the power failure sensor and adjusting brightness of at least one area of the display based on a residual capacity of the battery,
   wherein the controller is further capable of:
      controlling the power failure sensor to detect the power failure while the display is off, and
      controlling the display to turn on and present an image having a prescribed color when the power failure is sensed while the display is off,
   wherein the power failure sensor detects that the power failure has occurred when an inverter signal and a reference clock signal (Gclk) generated in the power supply are simultaneously switched to low levels, and
   wherein the power failure sensor determines that the power failure has not occurred when the inverter signal is switched to the low level before the reference clock signal.

2. The apparatus of claim 1, wherein the controller resets the at least one area of the display according to a user input to the external input device to re-adjust the brightness of the display.

3. The apparatus of claim 1, wherein the controller adjusts a brightness of at least a portion of a backlight that emits light to the display.

4. The apparatus of claim 3, wherein the at least the portion of the backlight for which the brightness is adjusted is differently set according to the residual capacity of the battery.

5. The apparatus of claim 1, wherein the controller, when power failure is sensed, scales down an image output on the display at a predetermined ratio, and outputs the scaled-down image on a partial area of the display.

6. The apparatus of claim 5, wherein a lamp, emitting light toward an area on which the scaled-down image is not output on the display, among a plurality of backlight lamps emitting light toward the display, is turned off.

7. The apparatus of claim 5, wherein the predetermined ratio is adjusted based on a user input.

8. The apparatus of claim 1, wherein the controller, when the power failure is sensed, selectively executes one of a general mode or a power-saving mode of using power of the battery in a saving manner based on the residual capacity of the battery.

9. The apparatus of claim 1, wherein the controller, when power failure is sensed, outputs power failure information notifying a user of the power failure on the at least one area of the display.

10. The apparatus of claim 9, wherein the power failure information includes at least one of a residual capacity of the battery, a time for which the image is outputtable on the display with the residual capacity of the battery, contact information regarding an organization associated with power failure, or an instruction for action upon an occurrence of the power failure.

11. The apparatus of claim 1, further comprising a signal input/output to transmit a message notifying an external computer of the power failure when the power failure is detected by the power failure sensor.

12. The apparatus of claim 11, wherein the controller outputs an estimated time, within which the power failure is expected to end, on the at least one area of the display when the predicted time is received from the external computer.

13. The apparatus of claim 12, wherein the controller calculates the brightness of the at least one area of the display for outputting the image until the estimated time based on the residual capacity of the battery, and adjusts the at least one area of the display to output the image at the calculated brightness.

14. The apparatus of claim 1, wherein the controller, when the power failure is detected, searches for an external device and transmits a control command to the external device to activate another display provided on the external device, the external device being located within a predetermined distance of the apparatus and being capable of performing wireless communication with the apparatus.

15. The apparatus of claim 1, wherein the controller, when power failure is detected, switches a channel of an image output on the display to a prescribed channel presenting information related to the power failure.

16. A method for controlling an image display apparatus receiving an input signal for selecting a channel from an external input device, the method comprising:
selecting a broadcast signal corresponding to a specific channel on the basis of the input signal, and outputting an image associated with the specific channel on a display using the selected broadcast signal;
charging, by a power supply, a battery while externally-supplied electric energy is received, and supplying by the power supply, power to the display using the externally-supplied electric energy;
sensing a power failure, wherein sensing the power failure includes:
determining that the power failure has occurred when an inverter signal and a reference clock signal (Gclk) generated in the power supply are simultaneously switched to low levels, and
determining that the power failure has not occurred when the inverter signal is switched to the low level while the reference clock signal remains at a high level;
supplying power to the display using the battery when the power failure occurs; and
adjusting a brightness of at least one area of the display based on a residual capacity of the battery,
wherein the method further comprises:
sensing whether the power failure occurs while the display is off; and
turning the display on and presenting an image having a prescribed color when the power failure is sensed while the display is off.

17. The method of claim 16, wherein adjusting the brightness of the at least one area of the display includes adjusting a brightness of at least one area, of an entire area, of a backlight that emits light to the display.

18. The method of claim 16, further comprising:
searching for an external device located within a predetermined distance of the image display apparatus and capable of performing wireless communication with the image display apparatus when power failure occurs; and
transmitting a control command to the external device to activate a secondary display provided on the external device.

19. The method of claim 16, further comprising outputting power failure information notifying a user of the power failure on the at least one area of the display.

* * * * *